United States Patent
Chen et al.

(10) Patent No.: US 10,218,455 B2
(45) Date of Patent: Feb. 26, 2019

(54) METHOD AND APPARATUS FOR INCREASING AND DECREASING VARIABLE OPTICAL CHANNEL BANDWIDTH

(71) Applicant: Huawei Technologies Co., Ltd., Shenzhen, Guangdong (CN)

(72) Inventors: Zhiyun Chen, Chengdu (CN); Xing Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 391 days.

(21) Appl. No.: 14/757,592

(22) Filed: Dec. 23, 2015

(65) Prior Publication Data

US 2016/0127072 A1  May 5, 2016

Related U.S. Application Data

(63) Continuation of application No. PCT/CN2013/077777, filed on Jun. 24, 2013.

(51) Int. Cl.
*H04J 14/00* (2006.01)
*H04J 14/02* (2006.01)
(Continued)

(52) U.S. Cl.
CPC .......... *H04J 14/0263* (2013.01); *H04B 10/27* (2013.01); *H04J 3/1652* (2013.01)

(58) Field of Classification Search
CPC ...... H04B 10/27; H04J 14/02; H04J 14/0263; H04J 14/086; H04J 3/1652;
(Continued)

(56) References Cited

U.S. PATENT DOCUMENTS

2007/0258450 A1  11/2007  Bennett
2012/0176990 A1  7/2012  Zou
(Continued)

FOREIGN PATENT DOCUMENTS

CN   101068205 A   11/2007
CN   101394310 A   3/2009
(Continued)

OTHER PUBLICATIONS

Josef Roese, "Consideration on ODUflex resizing", Telecommunication Standardization Sector, Sep. 2009, 3 pages.
(Continued)

*Primary Examiner* — Hanh Phan

(57) ABSTRACT

Embodiments of the present invention provide a method and an apparatus for increasing and decreasing variable optical channel bandwidth. The method for increasing includes: sending a higher order optical channel data unit (HO ODU) frame to which a timeslot increase indication is added to a second NE; starting from a next HO ODU frame, mapping, by an NE, a bit stream formed by a flexible optical transport data unit (ODUflex) bit stream at a first rate and an idle data bit stream to Y timeslots of the HO ODU frame; sending an ODUflex frame to which a rate increase indication is added to the second NE; and starting from a next ODUflex frame, mapping an ODUflex bit stream at a second rate to the Y timeslots of the HO ODU frame.

18 Claims, 8 Drawing Sheets

(51) Int. Cl.
*H04J 3/16* (2006.01)
*H04B 10/27* (2013.01)

(58) Field of Classification Search
CPC ............ H04Q 11/0003; H04Q 11/0066; H04L 47/25; H04L 47/266
USPC ........ 398/66, 67, 68, 69, 70, 71, 72, 79, 58, 398/98, 99, 100, 33, 45, 48, 49, 182, 183; 370/352, 392, 389, 468, 465, 254, 395.4
See application file for complete search history.

(56) References Cited

U.S. PATENT DOCUMENTS

| | | |
|---|---|---|
| 2012/0224857 A1 | 9/2012 | Su et al. |
| 2013/0101292 A1 | 4/2013 | Lanzone et al. |
| 2014/0178073 A1* | 6/2014 | Katagiri ............ H04Q 11/0066 398/66 |

FOREIGN PATENT DOCUMENTS

| | | |
|---|---|---|
| CN | 102025478 A | 4/2011 |
| CN | 102215153 A | 10/2011 |
| EP | 2 228 928 A1 | 9/2010 |
| EP | 2 434 712 A1 | 3/2012 |
| EP | 2 472 748 A1 | 7/2012 |

OTHER PUBLICATIONS

"Interfaces for the Optical Transport Network (OTN)", ITU-T, G.709/Y.1331, Corrigendum 1, Oct. 2012, 7 pages.

* cited by examiner

METHOD AND APPARATUS FOR INCREASING AND DECREASING VARIABLE OPTICAL CHANNEL BANDWIDTH

CROSS-REFERENCE TO RELATED APPLICATIONS

This application is a continuation of International Application No. PCT/CN2013/077777, filed on Jun. 24, 2013, which is hereby incorporated by reference in its entirety.

TECHNICAL FIELD

Embodiments of the present invention relate to communications technologies, and in particular, to a method and an apparatus for increasing and decreasing variable optical channel bandwidth.

BACKGROUND

ITU-T formulates a new flexible optical transport data unit (ODUflex) frame. An ODUflex still keeps a frame structure of an original optical channel data unit-k (ODUk) and is capable of bearing a constant bit rate (CBR) service and a packet service at any rate. In the technical solutions of the prior art, a packet service is mapped to an ODUflex by using the Generic Framing Procedure-Frame-Mapped (GFP-F), and then the ODUflex is mapped to a higher order optical channel data unit (HO ODU) by using the Generic Mapping Procedure (GMP) and is transported by using a higher order optical channel transport unit (HO OTU). The ODUflex is mapped to several timeslots (TS) in the HO ODU by using the GMP. At a receive end and a transmit end of an optical transport network (OTN), a processing process of the ODUflex is as follows: At the receive end, an HO ODUk multiframe is demapped, by using a GMP mapping method according to the number ($C'_m$) of m-bit client entities at the receive end, as an ODUflex bit stream that is then written in a first in first out queue (FIFO); and at the transmit end, an ODUflex bit stream output from the FIFO is mapped to an HO ODUj multiframe by using the GMP mapping method according to the number ($C_m$) of m-bit client entities at the transmit end. The receive end and the transmit end adjust $C_m$ and $C'_m$ according to a rate change of the ODUflex, so that rates of the receive end and the transmit end is consistent with a rate of the ODUflex. The characteristics of the foregoing method are as follows: A phase difference exists between a header of the HO ODUk multiframe and a header of the HO ODUj multiframe, and a FIFO delay exists at the receive end and the transmit end, causing a propagation delay when a rate of the ODUflex bit stream changes.

Because flows of a packet service have a non-real-time change characteristic, different bandwidth needs to be provided for an ODUflex to meet its different flows, and ODUflex channel bandwidth needs to be adjusted under the circumstances that the packet service is not interrupted. When the flows of the packet service change, the transmit end and the receive end implement a hitless adjustment to the ODUflex channel bandwidth by using $C_m$ and $C'_m$, and a phenomenon that FIFO depth changes sharply occurs, so that a FIFO of large space is required, so as to avoid appearing of two states of the FIFO: empty and full. However, the space of the FIFO is limited. To solve the foregoing technical problems, a source NE uses a method for making $C_m$ keep in a lower change rate and a smaller step, to keep a change rate of a rate of an ODUflex bit stream lower than 1 byte/100 us, so that the FIFO in 100 us automatically absorbs a jitter caused by a bit stream change.

However, in an existing process of adjusting ODUflex channel bandwidth, the change rate of $C_m$ is lower and the step is smaller, leading to a longer period used to adjust the ODUflex channel bandwidth. When the flow of a packet service born by an ODUflex changes, requirements of dynamic network planning cannot be met.

SUMMARY

Embodiments of the present invention provide a method and an apparatus for increasing and decreasing variable optical channel bandwidth, which are used to solve a defect of a long adjustment period of variable optical channel bandwidth and achieve a purpose for a hitless adjustment of the variable optical channel bandwidth.

According to a first aspect, an embodiment of the present invention provides a method for increasing variable optical channel bandwidth, including:

adding, by a first network node, a timeslot increase indication to an HO ODU frame and sending the HO ODU frame to which the timeslot increase indication is added to a second network node, where the timeslot increase indication is used to instruct a timeslot, occupied by an ODUflex bit stream, of the HO ODU frame, starting from a next HO ODU frame of the HO ODU frame, to increase from X timeslots to Y timeslots, X is greater than zero and less than Y, and the second network node is a downstream network node of the first network node in a link through which a service stream flows;

starting from the next HO ODU frame of the HO ODU frame to which the timeslot increase indication is added, mapping, by the first network node, a bit stream at a third rate formed by an ODUflex bit stream at the first rate and an idle data bit stream at a second rate to the Y timeslots of the HO ODU frame and sending the HO ODU frame to the second network node, where a rate corresponding to the Y timeslots of the HO ODU frame is greater than or equal to the third rate, both the first rate and the second rate are less than the third rate, and the second rate is a difference value between the third rate and the first rate;

after each network node in the link receives the HO ODU frame to which the timeslot increase indication is added, mapping, by the first network node, an ODUflex frame to which a rate increase indication is added to the HO ODU frame and sending the HO ODU frame to the second network node, where the ODUflex frame to which the rate increase indication is added is an ODUflex frame bearing the ODUflex bit stream, and the rate increase indication is used to instruct a rate of the ODUflex bit stream, starting from a next ODUflex frame of the ODUflex frame to which the rate increase indication is added, to increase from the first rate to the third rate; and starting from the next ODUflex frame of the ODUflex frame to which the rate increase indication is added, mapping, by the first network node, the ODUflex bit stream at the third rate to the Y timeslots of the HO ODU frame and sending the HO ODU frame to the second network node.

With reference to the first aspect, in a first possible implementation manner, an increase ratio of the rate of the ODUflex bit stream is the same as an increase ratio of the timeslot occupied by the ODUflex bit stream.

With reference to the first aspect or the first possible implementation manner of the first aspect, the adding, by a first network node, a timeslot increase indication to an HO ODU frame includes:

if the first network node is an intermediate network node in the link, and if the first network node adds the timeslot increase indication to an HO ODU frame that is received by a third network node, adding, by the first network node, the timeslot increase indication extracted from the received HO ODU frame to the HO ODU frame to be sent to the second network node, where the third network node is an upstream network node of the first network node in the link.

With reference to the first aspect or the first and a second possible implementation manner of the first aspect, in a third possible implementation manner, if the first network node is a source network node, before the mapping, by the first network node, an ODUflex to which a rate increase indication is added to the HO ODU frame and sending the HO ODU frame to the second network node, the method further includes:

after receiving response information, returned by a sink network node, that the HO ODU frame to which the timeslot increase indication is added has been received, adding, by the first network node, the rate increase indication to the ODUflex frame.

With reference to the first aspect or the first to the third possible implementation manners of the first aspect, in a fourth possible implementation manner, the mapping a bit stream at a third rate formed by an ODUflex bit stream at the first rate and an idle data bit stream at a second rate to the Y timeslots of the HO ODU frame includes:

mapping the bit stream at the third rate that is formed by, according to a byte interleaving manner, the ODUflex bit stream at the first rate and the idle data bit stream at the second rate to the Y timeslots of the HO ODU frame.

According to a second aspect, an embodiment of the present invention further provides another method for increasing variable optical channel bandwidth, including:

receiving, by a first network node, an HO ODU frame to which a timeslot increase indication is added and that is sent by a third network node, where the timeslot increase indication is used to instruct a timeslot, occupied by an ODUflex bit stream, of the HO ODU frame, starting from a next HO ODU frame of the HO ODU frame, to increase from X timeslots to Y timeslots, X is less than Y, and the third network node is an upstream network node of the first network node in a link through which a service stream flows;

starting from the next HO ODU frame of the HO ODU frame to which the timeslot increase indication is added, demapping, by the first network node from the Y timeslots of the HO ODU frame according to the timeslot increase indication, a bit stream at a third rate formed by an ODUflex bit stream at the first rate and an idle data bit stream at a second rate, and extracting the ODUflex bit stream at the first rate from the bit stream at the third rate, where a rate corresponding to the Y timeslots of the HO ODU frame is greater than or equal to the third rate, both the first rate and the second rate are less than the third rate, and the second rate is a difference value between the third rate and the first rate;

receiving, by the first network node, an ODUflex frame to which a rate increase indication is added and that is sent by the third network node, where the rate increase indication is used to instruct that a rate of the ODUflex bit stream, starting from a next ODUflex frame of the ODUflex frame to which the rate increase indication is added, to increase from the first rate to the third rate, and the ODUflex frame to which the rate increase indication is added is an ODUflex frame bearing the ODUflex bit stream; and starting from the next ODUflex frame of the ODUflex frame to which the rate increase indication is added, demapping, by the first network node, an ODUflex bit stream at the third rate from the Y timeslots of the received HO ODU frame according to the rate increase indication.

With reference to the second aspect, in a first possible implementation manner, an increase ratio of the rate of the ODUflex bit stream is the same as an increase ratio of the timeslot occupied by the ODUflex bit stream.

With reference to the second aspect, or the first possible implementation manner, in the second possible implementation manner, after the receiving, by a first network node, an HO ODU frame to which a timeslot increase indication is added and that is sent by a second network node, the method further includes:

if the first network node is a sink network node, sending, by the first network node, response information that the timeslot increase indication has been received to the third network node.

With reference to the second aspect or the first and second possible implementation manners of the second aspect, in a third possible implementation manner, the bit stream at the third rate is a bit stream formed by the ODUflex bit stream at the first rate and the idle data bit stream at the second rate according to a byte interleaving manner.

According to a third aspect, an embodiment of the present invention provides an apparatus for increasing variable optical channel bandwidth, including:

an adding module, configured to add a timeslot increase indication to an HO ODU frame, where the timeslot increase indication is used to instruct a timeslot, occupied by an ODUflex bit stream, of the HO ODU frame, starting from a next HO ODU frame of the HO ODU frame, to increase from X timeslots to Y timeslots, and X is greater than zero and less than Y;

a sending module, configured to send the HO ODU frame to which the timeslot increase indication is added by the adding module to a second network node, where the second network node is a downstream network node of a network node on which the apparatus is located in a link through which a service stream flows; and a mapping module, configured to, after the sending module sends the HO ODU frame to which the timeslot increase indication is added to the second network node, starting from the next HO ODU frame of the HO ODU frame to which the timeslot increase indication is added, map a bit stream at a third rate formed by an ODUflex bit stream at the first rate and an idle data bit stream at a second rate to the Y timeslots of the HO ODU frame, where a rate corresponding to the Y timeslots of the HO ODU frame is greater than or equal to the third rate, both the first rate and the second rate are less than the third rate, and the second rate is a difference value between the third rate and the first rate, where:

the sending module is further configured to send the HO ODU frame mapped by the mapping module to the second network node;

the mapping module is further configured to, after each network node in the link receives the HO ODU frame to which the timeslot increase indication is added, map an ODUflex frame to which a rate increase indication is added to the HO ODU frame, where the ODUflex frame to which the rate increase indication is added is an ODUflex frame bearing the ODUflex bit stream, and the rate increase indication is used to instruct a rate of the ODUflex bit stream, starting from a next ODUflex frame of the ODUflex frame to which the rate increase indication is added, to increase from the first rate to the third rate; and the mapping module is further configured to, starting from the next ODUflex frame of the ODUflex frame to which the rate increase indication is added, map the ODUflex bit stream at the third rate to the Y timeslots of the HO ODU frame.

According to a fourth aspect, an embodiment of the present invention further provides an apparatus for increasing variable optical channel bandwidth, including:

a receiving module, configured to receive an HO ODU frame to which a timeslot increase indication is added and that is sent by a third network node, where the timeslot increase indication is used to instruct a timeslot, occupied by an ODUflex bit stream, of the HO ODU frame, starting from a next HO ODU frame of the HO ODU frame, to increase from X timeslots to Y timeslots, X is less than Y, and the third network node is an upstream network node of a network node on which the apparatus is located in a link through which a service stream flows; and a demapping module, configured to, starting from a next HO ODUj frame of an HO ODUj frame to which the timeslot increase indication is added, demap from Y timeslots of the HO ODU frame, according to the timeslot increase indication received by the receiving module, a bit stream at a third rate formed by an ODUflex bit stream at the first rate and an idle data bit stream at a second rate, and extract the ODUflex bit stream at the first rate from the bit stream at the third rate, where both the first rate and the second rate are less than the third rate, and the second rate is a difference value between the third rate and the first rate, where:

the receiving module is further configured to receive an ODUflex frame to which a rate increase indication is added and that is sent by the third network node, where the rate increase indication is used to instruct a rate of the ODUflex bit stream, starting from a next ODUflex frame of the ODUflex frame to which the rate increase indication is added, to increase from the first rate to the third rate, the Y timeslots occupied by the ODUflex bit stream at the third rate are capable of bearing the ODUflex bit stream at the third rate, and a rate corresponding to the Y timeslots of the HO ODU frame is greater than or equal to the third rate; and the demapping module is further configured to, starting from the next ODUflex frame of the ODUflex frame to which the rate increase indication is added, demap the ODUflex bit stream at the third rate from the Y timeslots of the received HO ODU frame according to the rate increase indication received by the receiving module.

According to a fifth aspect, an embodiment of the present invention provides a first network node, including: a memory, a processor, a communications interface, and a bus, where the memory, the processor, and the communications interface communicate with each other by using the bus;

the memory is configured to store a program, the processor is configured to execute the program executed in the memory, and the communications interface is configured to communicate with a second network node and a third network node, where the third network node is an upstream network node of the first network node in a link through which a service stream flows, and the second network node is a downstream network node of the first network node in the link; and the program is configured to:

add a timeslot increase indication to an HO ODU frame and send the HO ODU frame to which the timeslot increase indication is added to the second network node, where the timeslot increase indication is used to instruct a timeslot, occupied by an ODUflex bit stream, of the HO ODU frame, starting from a next HO ODU frame of the HO ODU frame, to increase from X timeslots to Y timeslots, X is greater than zero and less than Y, and the second network node is the downstream network node of the first network node in the link through which the service stream flows;

starting from the next HO ODU frame of the HO ODU frame to which the timeslot increase indication is added, map a bit stream at a third rate formed by an ODUflex bit stream at the first rate and an idle data bit stream at a second rate to the Y timeslots of the HO ODU frame and send the HO ODU frame to the second network node, where a rate corresponding to the Y timeslots of the HO ODU frame is greater than or equal to the third rate, both the first rate and the second rate are less than the third rate, and the second rate is a difference value between the third rate and the first rate;

after each network node in the link receives the HO ODU frame to which the timeslot increase indication is added, map an ODUflex frame to which a rate increase indication is added to the HO ODU frame and send the HO ODU frame to the downstream network node, where the ODUflex frame to which the rate increase indication is added is an ODUflex frame bearing the ODUflex bit stream, and the rate increase indication is used to instruct a rate of the ODUflex bit stream, starting from a next ODUflex frame of the ODUflex frame to which the rate increase indication is added, to increase from the first rate to the third rate; and starting from the next ODUflex frame of the ODUflex frame to which the rate increase indication is added, map the ODUflex bit stream at the third rate to the Y timeslots of the HO ODU frame and send the HO ODU frame to the second network node.

According to a sixth aspect, an embodiment of the present invention provides another first network node, including: a memory, a processor, a communications interface, and a bus, where the memory, the processor, and the communications interface communicate with each other by using the bus;

the memory is configured to store a program, the processor is configured to execute the program executed in the memory, and the communications interface is configured to communicate with a second network node and a third network node, where the third network node is an upstream network node of the first network node in a link through which a service stream flows, and the second network node is a downstream network node of the first network node in the link; and the program is configured to:

receive an HO ODU frame to which a timeslot increase indication is added and that is sent by the third network node, where the timeslot increase indication is used to instruct a timeslot, occupied by an ODUflex bit stream, of the HO ODU frame, starting from a next HO ODU frame of the HO ODU frame, to increase from X timeslots to Y timeslots, and X is less than Y;

starting from the next HO ODU frame of the HO ODU frame to which the timeslot increase indication is added, demap from the Y timeslots of the HO ODU frame, according to the timeslot increase indication, a bit stream at a third rate formed by an ODUflex bit stream at the first rate and an idle data bit stream at a second rate, and extract the ODUflex bit stream at the first rate from the bit stream at the third rate, where a rate corresponding to the Y timeslots of the HO ODU frame is greater than or equal to the third rate, both the first rate and the second rate are less than the third rate, and the second rate is a difference value between the third rate and the first rate;

receive an ODUflex frame to which a rate increase indication is added and that is sent by the third network node, where the rate increase indication is used to instruct a rate of the ODUflex bit stream, starting from a next ODUflex frame of the ODUflex frame to which the rate increase indication is added, to increase from the first rate to the third rate, and the ODUflex frame to which the rate increase indication is added is an ODUflex frame bearing the ODUflex bit stream; and starting from the next ODUflex frame of the ODUflex frame to which the rate increase indication is added, demap the ODUflex bit stream at the third rate from the Y timeslots of the received HO ODU frame according to the rate increase indication.

In the foregoing technical solutions provided in the first aspect to the sixth aspect, a first NE sends, in a current HO ODU frame, a timeslot increase indication of an ODUflex bit stream to a downstream NE, that is, a second NE, and starting from a next HO ODU frame, sends, in an increased timeslot in the HO ODU frame, a bit stream at a high rate formed by an ODUflex bit stream at an original rate and an idle data bit stream to the second NE. Then, a rate increase indication is sent, in an ODUflex frame, to the second NE, and starting from a next ODUflex frame, an ODUflex bit stream at a high rate is sent in the increased timeslot in the HO ODU frame, to the second NE. In a process of increasing a variable optical channel, a change rate and a value of a step of the number of m-bit client entities are not dependent on; and therefore, a period of increasing the variable optical channel bandwidth is shortened. In a phase of timeslot increasing, the first NE sends, in the HO ODU frame after a timeslot is increased, a bit stream at a high rate formed by an ODUflex bit stream and an idle data bit stream to the second NE, and after a timeslot, occupied by the ODUflex bit stream, of the HO ODU frame increases in each link segment between a source NE and a sink NE, sends an ODUflex bit stream at a high rate to the second NE, so that a rate matching between the ODUflex frame and the HO ODU frame carrying the ODUflex frame is implemented, a purpose for a hitless channel bandwidth increase is achieved, and it is not necessary to reserve resources for the ODUflex frame in advance.

According to a seventh aspect, an embodiment of the present invention further provides a method for decreasing variable optical channel bandwidth, including:

sending, by a first network node, an ODUflex frame to which a rate decrease indication is added to a second network node, where the rate decrease indication is used to instruct a rate of an ODUflex bit stream, starting from a next ODUflex frame of the ODUflex frame to which the rate decrease indication is added, to decrease from a third rate to a first rate, and the second network node is a downstream network node of the first network node in a link through which a service stream flows;

starting from the next ODUflex frame of the ODUflex frame to which the rate decrease indication is added, mapping, by the first network node, a bit stream at the third rate formed by an ODUflex bit stream at the first rate and an idle data bit stream at a second rate to Y timeslots of an HO ODU frame and sending the HO ODU frame to the second network node, where the second rate is less than the third rate, and the second rate is a difference value between the third rate and the first rate;

after each network node in the link receives the ODUflex frame to which the rate decrease indication is added, adding, by the first network node, a timeslot decrease indication to the HO ODU frame and sending the HO ODU frame to which the timeslot decrease indication is added to the second network node, where the timeslot decrease indication is used to instruct a timeslot, occupied by the ODUflex bit stream, of the HO ODU frame, starting from a next HO ODU frame of the HO ODU frame to which the timeslot decrease indication is added, to decrease from the Y timeslots to X timeslots, X is greater than zero and less than Y, and a rate corresponding to the X timeslots of the HO ODU frame is greater than or equal to the first rate; and starting from the next HO ODU frame of the HO ODU frame to which the timeslot decrease indication is added, mapping, by the first network node, the ODUflex bit stream at the first rate to the X timeslots in the HO ODU frame and sending the HO ODU frame to the second network node.

With reference to the seventh aspect, in a first possible implementation manner, a decrease ratio of the timeslot occupied by the ODUflex bit stream is the same as a decrease ratio of the rate of the ODUflex bit stream.

With reference to the seventh aspect or the first possible implementation manner of the seventh aspect, before the sending an ODUflex frame to which a rate decrease indication is added to a second network node, the method further includes:

if the first network node is a source network node, adding the rate decrease indication to the ODUflex frame to be sent to the second network node.

With reference to the seventh aspect or the first and a second possible implementation manners of the seventh aspect, in a third possible implementation manner, the adding a timeslot decrease indication to the HO ODU frame includes:

if the first network node is the source network node, after receiving response information, returned by a sink network node, that the ODUflex frame to which the rate decrease indication is added has been received, adding, by the first network node, the timeslot decrease indication to the HO ODU frame; and if the first network node is an intermediate network node, and an HO ODU frame that is received by the first network node and sent by a third network node includes the timeslot decrease indication, adding, by the first network node, the timeslot decrease indication extracted from the HO ODU frame sent by the third network node to the HO ODU frame to be sent to the second network node, where the third network node is an upstream network node of the first network node in the link through which the service stream flows.

With reference to the seventh aspect or the first to the third possible implementation manners of the seventh aspect, in a fourth possible implementation manner, the mapping a bit stream at the third rate formed by an ODUflex bit stream at the first rate and an idle data bit stream at a second rate to Y timeslots of an HO ODU frame includes:

mapping the bit stream at the third rate that is formed by, according to a byte interleaving manner, the ODUflex bit stream at the first rate and the idle data bit stream at the second rate to the Y timeslots of the HO ODU frame.

According to an eighth aspect, an embodiment of the present invention further provides another method for decreasing variable optical channel bandwidth, including:

receiving, by a first network node, an ODUflex frame to which a rate decrease indication is added and that is sent by a third network node, where the rate decrease indication is used to instruct a rate of an ODUflex bit stream, starting from a next ODUflex frame of the ODUflex frame to which the rate decrease indication is added, to decrease from a third rate to a first rate, and the third network node is an upstream network node of the first network node in a link through which a service stream flows;

starting from the next ODUflex frame of the ODUflex frame to which the rate decrease indication is added, demapping, by the first network node from Y timeslots of an HO ODU frame according to the rate decrease indication, a bit stream at the third rate formed by an ODUflex bit stream at the first rate and an idle data bit stream at a second rate, and extracting the ODUflex bit stream at the first rate from the bit stream at the third rate, where the second rate is a difference value between the third rate and the first rate;

receiving, by the first network node, an HO ODU frame to which a timeslot decrease indication is added and that is sent by the third network node, where the timeslot decrease indication is used to instruct a timeslot, occupied by the ODUflex bit stream, of the HO ODU frame, starting from a next HO ODU frame of the HO ODU frame to which the timeslot decrease indication is added, to decrease from the Y timeslots to X timeslots, X is greater than zero and less than Y, and a rate corresponding to the X timeslots of the HO ODU frame is greater than or equal to the first rate; and starting from the next HO ODU frame of the HO ODU frame to which the timeslot decrease indication is added, demapping, by the first network node, the ODUflex bit stream at the first rate from the X timeslots of the HO ODU frame according to the timeslot decrease indication.

With reference to the eighth aspect, in a first possible implementation manner, a decrease ratio of the timeslot occupied by the ODUflex bit stream is the same as a decrease ratio of the rate of the ODUflex bit stream.

With reference to the eighth aspect or the first possible implementation manner of the eighth aspect, in a second possible implementation manner, after the receiving, by the first network node, an HO ODU frame to which the timeslot decrease indication is added and that is sent by a second network node, the method further includes:

if the first network node is a sink network node, sending, by the first network node, response information that the rate decrease indication has been received to the second network node.

With reference to the eighth aspect or the first and second possible implementation manners of the eighth aspect, in a third possible implementation manner, the bit stream at the third rate is a bit stream formed by the ODUflex bit stream at the first rate and the idle data bit stream at the second rate according to a byte interleaving manner.

According to a ninth aspect, an embodiment of the present invention further provides another apparatus for decreasing variable optical channel bandwidth, including:

a sending module, configured to send an ODUflex frame to which a rate decrease indication is added to a second network node, where the rate decrease indication is used to instruct a rate of an ODUflex bit stream, starting from a next ODUflex frame of the ODUflex frame to which the rate decrease indication is added, to decrease from a third rate to a first rate, and the second network node is a downstream network node of the first network node in a link through which a service stream flows;

a mapping module, configured to, starting from the next ODUflex frame of the ODUflex frame to which the rate decrease indication is added, map a bit stream at the third rate formed by an ODUflex bit stream at the first rate and an idle data bit stream at a second rate to Y timeslots of an HO ODU frame, where the second rate is less than the third rate, and the second rate is a difference value between the third rate and the first rate; and an adding module, configured to, after each network node in the link receives the ODUflex frame to which the rate decrease indication is added, add a timeslot decrease indication to the HO ODU frame, where the timeslot decrease indication is used to instruct a timeslot, occupied by the ODUflex bit stream, of the HO ODU frame, starting from a next HO ODU frame of the HO ODU frame to which the timeslot decrease indication is added, to decrease from the Y timeslots to X timeslots, X is greater than zero and less than Y, and a rate corresponding to the X timeslots of the HO ODU frame is greater than or equal to the first rate, where:

the sending module is further configured to send the HO ODU frame to which the timeslot decrease indication is added to the second network node;

the mapping module is further configured to, starting from the next HO ODU frame of the HO ODU frame to which the timeslot decrease indication is added, map the ODUflex bit stream at the first rate to the X timeslots in the HO ODU frame; and the sending module is further configured to send the HO ODU frame after the mapping by the mapping module to the second network node.

According to a tenth aspect, an embodiment of the present invention further provides another apparatus for decreasing variable optical channel bandwidth, including:

a receiving module, configured to receive an ODUflex frame to which a rate decrease indication is added and that is sent by a third network node, where the rate decrease indication is used to instruct a rate of an ODUflex bit stream, starting from a next ODUflex frame of the ODUflex frame to which the rate decrease indication is added, to decrease from a third rate to a first rate, and the third network node is an upstream network node of the first network node in a link through which a service stream flows; and a demapping module, configured to, starting from the next ODUflex frame of the ODUflex frame to which the rate decrease indication is added, demap from Y timeslots of an HO ODU frame, according to the rate decrease indication, a bit stream at the third rate formed by an ODUflex bit stream at the first rate and an idle data bit stream at a second rate, and extract the ODUflex bit stream at the first rate from the bit stream at the third rate, where the second rate is a difference value between the third rate and the first rate, where:

the receiving module is further configured to receive an HO ODU frame to which the timeslot decrease indication is added and that is sent by the third network node, where the timeslot decrease indication is used to instruct a timeslot, occupied by the ODUflex bit stream, of the HO ODU frame, starting from a next HO ODU frame of the HO ODU frame to which the timeslot decrease indication is added, to decrease from the Y timeslots to X timeslots, X is greater than zero and less than Y, and a rate corresponding to the X timeslots of the HO ODU frame is greater than or equal to the first rate; and the demapping module is configured to, starting from the next HO ODU frame of the HO ODU frame to which the timeslot decrease indication is added, demap the ODUflex bit stream at the first rate from the X timeslots of the HO ODU frame according to the timeslot decrease indication.

According to an eleventh aspect, an embodiment of the present invention further provides yet another first network node, including: a memory, a processor, a communications interface, and a bus, where the memory, the processor, and the communications interface communicate with each other by using the bus;

the memory is configured to store a program, the processor is configured to execute the program executed in the memory, and the communications interface is configured to communicate with a second network node and a third network node, where the third network node is an upstream network node of the first network node in a link through which a service stream flows, and the second network node is a downstream network node of the first network node in the link; and the program is configured to:

send an ODUflex frame to which a rate decrease indication is added to the second network node, where the rate decrease indication is used to instruct a rate of an ODUflex bit stream, starting from a next ODUflex frame of the ODUflex frame to which the rate decrease indication is added, to decrease from a third rate to a first rate, where:

starting from the next ODUflex frame of the ODUflex frame to which the rate decrease indication is added, the first network node maps a bit stream at the third rate formed by an ODUflex bit stream at the first rate and an idle data bit stream at a second rate to Y timeslots of an HO ODU frame and sends the HO ODU frame to the second network node, where the second rate is less than the third rate, and the second rate is a difference value between the third rate and the first rate;

after each network node in the link receives the ODUflex frame to which the rate decrease indication is added, the first network node adds a timeslot decrease indication to the HO ODU frame and sends the HO ODU frame to which the timeslot decrease indication is added to the second network node, where the timeslot decrease indication is used to instruct a timeslot, occupied by the ODUflex bit stream, of the HO ODU frame, starting from a next HO ODU frame of the HO ODU frame to which the timeslot decrease indication is added, to decrease from the Y timeslots to X timeslots, X is greater than zero and less than Y, and a rate corresponding to the X timeslots of the HO ODU frame is greater than or equal to the first rate; and starting from the next HO ODU frame of the HO ODU frame to which the timeslot decrease indication is added, the first network node maps the ODUflex bit stream at the first rate to the X timeslots in the HO ODU frame and sends the HO ODU frame to the second network node.

According to a twelfth aspect, an embodiment of the present invention further provides still another first network node, including: a memory, a processor, a communications interface, and a bus, where the memory, the processor, and the communications interface communicate with each other by using the bus;

the memory is configured to store a program, the processor is configured to execute the program executed in the memory, and the communications interface is configured to communicate with a second network node and a third network node, where the third network node is an upstream network node of the first network node in a link through which a service stream flows, and the second network node is a downstream network node of the first network node in the link; and the program is configured to:

receive an ODUflex frame to which a rate decrease indication is added and that is sent by the third the network node, where the rate decrease indication is used to instruct a rate of an ODUflex bit stream, starting from a next ODUflex frame of the ODUflex frame to which the rate decrease indication is added, to decrease from a third rate to a first rate;

starting from the next ODUflex frame of the ODUflex frame to which the rate decrease indication is added, demap from Y timeslots of an HO ODU frame, according to the rate decrease indication, a bit stream at the third rate formed by an ODUflex bit stream at the first rate and an idle data bit stream at a second rate, and extract the ODUflex bit stream at the first rate from the bit stream at the third rate, where the second rate is a difference value between the third rate and the first rate;

receive an HO ODU frame to which the timeslot decrease indication is added and that is sent by the third network node, where the timeslot decrease indication is used to instruct a timeslot, occupied by the ODUflex bit stream, of the HO ODU frame, starting from a next HO ODU frame of the HO ODU frame to which the timeslot decrease indication is added, to decrease from the Y timeslots to X timeslots, X is greater than zero and less than Y, and a rate corresponding to the X timeslots of the HO ODU frame is greater than or equal to the first rate; and starting from the next HO ODU frame of the HO ODU frame to which the timeslot decrease indication is added, demap the ODUflex bit stream at the first rate from the X timeslots of the HO ODU frame according to the timeslot decrease indication.

In the foregoing technical solutions, a first NE sends, in a current ODUflex frame, a rate decrease indication to a downstream NE, that is, a second NE, and starting from a next ODUflex frame to be sent to the downstream NE, decreases a rate of an ODUflex bit stream; and then, adds a timeslot decrease indication to a current HO ODU frame, and starting from a next HO ODU frame, decreases a timeslot occupied by the ODUflex frame in the HO ODU frame. In a process of increasing a variable optical channel, a change rate and a step size of the number of m-bit client entities are not dependent on; and therefore, a period of decreasing the variable optical channel bandwidth is shortened. In a phase of rate decreasing, in an original timeslot occupied by a bit stream at an original rate in the HO ODU frame, a bit stream at a high rate formed by an ODUflex bit stream at a low rate and an idle data bit stream to the second NE. After a rate of an ODUflex bit stream in each link segment between a source NE and a sink NE decreases, the ODUflex bit stream at a low rate is sent, in the HO ODU frame after a timeslot is decreased, to the second NE, so that a rate matching between the ODUflex frame and the HO ODU frame to which the ODUflex frame is loaded is implemented, and a purpose for a hitless channel bandwidth decrease is achieved.

DETAILED DESCRIPTION

In a process of implementing the present invention, the inventor finds the following: A process of adjusting ODUflex channel bandwidth relates to adjustments of two aspects: one is an adjustment to a TS, occupied by an ODUflex bit stream, of an HO ODU, and the other is an adjustment, performed by an ODUflex, to a rate of the ODUflex to adapt to a new flow of a packet service. For an adjustment process of increasing the ODUflex channel bandwidth, first the TS, occupied by the ODUflex bit stream, of the HO ODU is increased in each link segment through which the ODUflex bit stream passes, and then the rate of the ODUflex bit stream is increased. For an adjustment process of decreasing the ODUflex channel bandwidth, first the rate of the ODUflex bit stream is decreased, and then the TS, occupied by the ODUflex bit stream, of the HO ODU is decreased.

One HO ODU frame may bear multiple ODUflex bit streams. In methods for adjusting optical channel bandwidth that are provided in embodiments of the present invention, channel bandwidth of multiple specified ODUflex bit streams may be increased/decreased or channel bandwidth of one specified ODUflex bit stream may be increased/decreased.

Figure 1A:
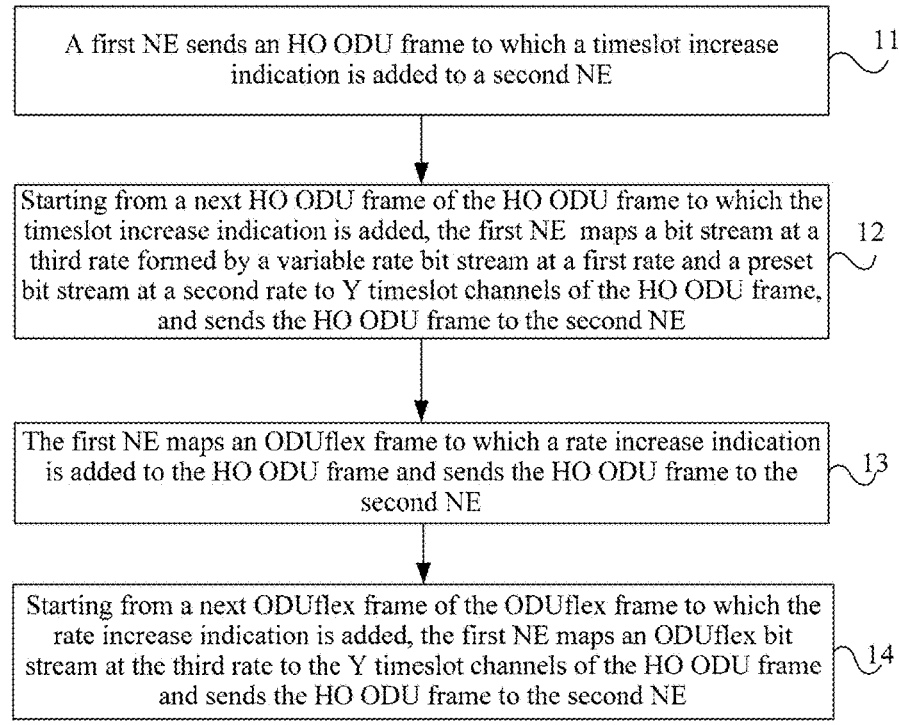
FIG. 1A is a flowchart of a method for increasing optical channel bandwidth according to an embodiment of the present invention.

FIG. 1A is a flowchart of a method for increasing optical channel bandwidth according to an embodiment of the present invention. The method provided in this embodiment is implemented by a transmit side of a first NE, and the first NE may be a source NE in a link through which a service stream flows or may be any intermediate NE in the link. As shown in FIG. 1A, the method provided in this embodiment includes:

Step 11: The first NE sends an HO ODU frame to which a timeslot increase indication is added to a second NE, where the timeslot increase indication is used to instruct a timeslot, occupied by an ODUflex bit stream, of the HO ODU frame, starting from a next HO ODU frame of the HO ODU frame, to increase from X timeslots to Y timeslots. X is greater than zero and less than Y. The second NE is a downstream NE of the first NE in a link through which a service stream flows.

Figure 1B:
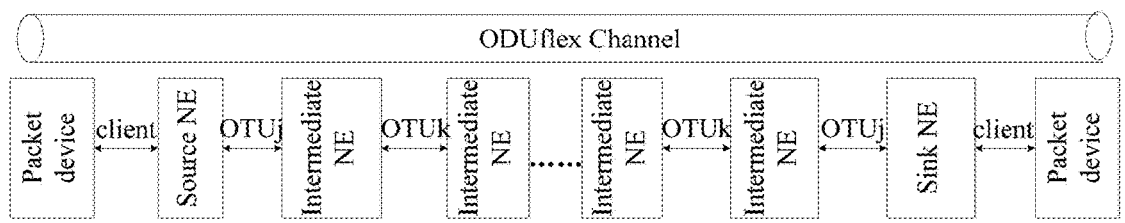
FIG. 1B is a schematic diagram of an optical channel according to an embodiment of the present invention.

As shown in a schematic diagram of an optical channel in FIG. 1B, the optical channel is formed by a source NE, several intermediate NEs, a sink NE, and a link between them. A network node (NE) that executes this embodiment, may be the source NE or may be an intermediate NE in the link from the source NE to the sink NE.

The first NE maps an ODUflex bit stream to be sent to the second NE to the HO ODU frame, and then adds the timeslot increase indication to an overhead of the HO ODU frame. The timeslot increase indication is used to instruct a downstream NE, starting from a next HO ODU frame of the current HO ODU frame, to increase the ODUflex bit stream borne in the HO ODU frame from X timeslots to Y timeslots, that is, the HO ODU frame bears the ODUflex bit stream by using Y timeslots.

Optionally, the timeslot increase indication in the HO ODU frame may specify a timeslot increase of one ODUflex bit stream borne in the HO ODU frame or may specify a timeslot increase of multiple ODUflex bit streams borne in the HO ODU frame. If channel bandwidth of the multiple ODUflex bit streams is increased, multiple timeslot increase indications may be added to the overhead of the HO ODU frame, each timeslot increase indication separately corresponds to one ODUflex bit stream, and one timeslot increase indication is used to instruct a timeslot, occupied by a corresponding ODUflex bit stream, of the HO ODU frame, starting from the next HO ODU frame of the current HO ODU frame, to increase from X timeslots to Y timeslots.

The first NE maps the ODUflex bit stream sent to the second NE to the HO ODU frame, and then adds the timeslot increase indication to the overhead of the HO ODU frame. After a receive side of the second NE receives the HO ODU frame from the first NE, if determining that the HO ODU frame includes the timeslot increase indication, extracts the timeslot increase indication from the HO ODU frame, and demaps the ODUflex bit stream from the X timeslots of the HO ODU frame. Optionally, the first NE may instruct, in a specified domain of the HO ODU frame, whether the timeslot increase indication is added to the current HO ODU frame; and after receiving the HO ODU frame, a downstream NE of the first NE determines, by using a value of the specified domain, whether the timeslot increase indication is added to the current HO ODU frame.

A transmit side of the second NE maps the ODUflex bit stream demapped by the receive side to the X timeslots of the HO ODU frame. If the timeslot increase indication is added to the HO ODU frame received from the first NE, the second NE adds the timeslot increase indication extracted on the receive side to an HO ODU frame to be sent to a downstream NE, then sends the HO ODU frame to the downstream NE of the second NE, and by analogy, until a sink NE receives the HO ODU frame to which the timeslot increase indication is added. Starting from the next HO ODU frame of the HO ODU frame, the second UE demaps the ODUflex bit stream from the Y timeslots of the HO ODU frame according to the timeslot increase indication.

Step 12: Starting from the next HO ODU frame of the HO ODU frame to which the timeslot increase indication is added, the first NE maps a bit stream at a third rate formed by an ODUflex bit stream at a first rate and an idle data bit stream at a second rate to the Y timeslots of the HO ODU frame and sends the HO ODU frame to the second NE, where both the first rate and the second rate are less than the third rate, and the second rate is a difference value between the third rate and the first rate.

After sending the HO ODU frame to which the timeslot increase indication is added to a downstream NE of the first NE, that is, the second NE, the first NE, starting from the next HO ODU frame of the HO ODU frame, increases a timeslot, which is specified by the timeslot increase indication and occupied by the ODUflex bit stream, of the HO ODU frame in the link in which the first NE is located. Before a sink NE increases the timeslot, occupied by the ODUflex bit stream, of the HO ODU frame, to implement a hitless adjustment, an NE first forms the bit stream at the third rate by using the ODUflex bit stream at the first rate and the idle data bit stream at the second rate, for example, the ODUflex bit stream at the first rate and the idle data bit stream at the second rate form the bit stream at the third rate according to a byte interleaving manner; and then maps the bit stream at the third rate to the Y timeslots of the HO ODU frame. The idle data bit stream may be an idle bit stream, for example, a bit stream of all 0s or all 1s. After receiving the HO ODU frame to which the timeslot increase indication is added, the downstream NE, starting from the next HO ODU frame of the HO ODU frame, demaps the bit stream at the third rate from the Y timeslots of the HO ODU frame and extracts the ODUflex bit stream at the first rate from the bit stream at the third rate.

Step 13: After each NE in the link receives the HO ODU frame to which the timeslot increase indication is added, the first NE maps an ODUflex frame to which a rate increase indication is added to the HO ODU frame and sends the HO ODU frame to the second NE, where the ODUflex frame to which the rate increase indication is added is an ODUflex frame bearing the ODUflex bit stream, and the rate increase indication is used to instruct a rate of the ODUflex bit stream, starting from a next ODUflex frame of the ODUflex frame to which the rate increase indication is added, to increase from the first rate to the third rate. A rate corresponding to the Y timeslots of the HO ODU frame is greater than or equal to the third rate.

If the second NE is a sink NE, after receiving the HO ODU frame to which the timeslot increase indication is added, the second NE feeds back a response message that the HO ODU frame has been received to the first NE, where the response message is transmitted to a source NE along a link from the sink NE to the source NE. After receiving the response message returned by the sink NE, the source NE determines that each NE in the link between the source NE and the sink NE has received the HO ODU frame to which the timeslot increase indication is added, and may further determine that the timeslot occupied by the ODUflex bit stream in the HO ODU frame has been successfully increased in the link between the source NE and the sink NE. After receiving the response message returned by the sink NE, the source NE adds the rate increase indication to an overhead of an ODUflex frame corresponding to an ODUflex bit stream specified by the timeslot increase indication, maps, to the Y timeslots of the HO ODU frame, the bit stream at the third rate formed by the ODUflex bit stream to which the rate increase indication is added and the idle data bit stream, and sends the HO ODU frame to a downstream NE.

The rate increase indication is used to instruct a rate of a borne ODUflex bit stream, starting from a next ODUflex frame of the ODUflex frame to which the rate increase indication is added, to increase from the first rate to the second rate, where a bit stream at the third rate formed by a variable bit stream at the first rate and the idle data bit stream at the second rate is no longer mapped to the Y timeslots of the HO ODU frame. The rate corresponding to the Y timeslots of the HO ODU frame is greater than or equal to the third rate. Further, an increase ratio of the rate of the ODUflex bit stream is the same as an increase ratio of the timeslot of the ODUflex bit stream, so that the HO ODU frame bearing the ODUflex bit stream matches the rate of the ODUflex bit stream. For example, the timeslot occupied by the ODUflex bit stream increases from one to two; and accordingly, the rate increases from one time of an ODU 0 rate to two times of the ODU 0 rate. For another example, timeslots occupied by the ODUflex bit stream increase from three to five; and accordingly, the rate increases from three times of the ODU 0 rate to five times of the ODU 0 rate.

If the first NE is a source NE, in step 11, the first NE adds multiple timeslot increase indications to the overhead of the HO ODU frame, where the multiple timeslot increase indications are separately used to instruct to increase timeslots occupied by different ODUflex bit streams; or the first NE adds one timeslot increase indication to the overhead of the HO ODU frame, where the timeslot increase indication is used to instruct to increase timeslots occupied by multiple ODUflex bit streams, so that the first NE needs to separately add the rate increase indication to multiple ODUflex frames of the HO ODU frame, so as to instruct to increase rates of different ODUflex bit streams. When receiving the HO ODU frame, the receive side of the second NE demaps the bit stream at the third rate and extracts, from the bit stream at the third rate, an ODUflex frame, at the first rate, to which the rate increase indication is added. The transmit side of the second NE maps, to the Y timeslots of the HO ODU frame, the bit stream at the third rate formed by the idle data bit stream at the second rate and the ODUflex frame, at the first rate, to which the rate increase indication is added, and sends the HO ODU frame to a downstream NE of the second NE, where the ODUflex frame at the first rate is extracted on the receive side, and by analogy, until the sink NE receives the ODUflex frame to which the rate increase indication is added. The rate increase indication is added to the overhead of the ODUflex frame, and after demapping the ODUflex frame from the HO ODU frame, an intermediate NE does not modify the ODUflex frame. Therefore, the rate increase indication is generated from the source NE and is transmitted to the sink NE all the way, and the intermediate NE does not modify the rate increase indication.

Step 14: Starting from the next ODUflex frame of the ODUflex frame to which the rate increase indication is added, the first NE maps the ODUflex bit stream at the third rate to the Y timeslots of the HO ODU frame and sends the HO ODU frame to the second NE.

Starting from the next ODUflex frame of the ODUflex frame to which the rate increase indication is added, the ODUflex bit stream occupies Y timeslots of the HO ODU frame sent by the first NE and a rate of the ODUflex bit stream is the third rate.

According to a method for increasing variable optical channel bandwidth provided in this embodiment, an NE sends, in a current HO ODU frame, a timeslot increase indication of an ODUflex bit stream to a downstream NE, and starting from a next HO ODU frame, sends, in an increased timeslot in the HO ODU frame, a bit stream at a high rate formed by an ODUflex bit stream at an original rate and an idle data bit stream to the downstream NE. Then, a rate increase indication is sent, in an ODUflex frame, to the downstream NE, and starting from a next ODUflex frame, an ODUflex bit stream at a high rate is sent, in the increased timeslot in the HO ODU frame, to the downstream NE. In a process of increasing a variable optical channel, a change rate and a step size of the number of m-bit client entities are not dependent on; and therefore, a period of increasing the variable optical channel bandwidth is shortened. In a phase of timeslot increasing, the NE first sends, in the HO ODU frame after a timeslot is increased, a bit stream at a high rate formed by an ODUflex bit stream and an idle data bit stream to the downstream NE, and after a timeslot, occupied by the ODUflex bit stream, of the HO ODU frame increases in each link segment between a source NE and a sink NE, sends an ODUflex bit stream at a high rate to the downstream NE, so that a rate matching between the ODUflex frame and the HO ODU frame to which the ODUflex frame is loaded is implemented, a purpose for a hitless channel bandwidth increase is achieved, and it is not necessary to reserve resources for the ODUflex frame in advance.

Figure 2:
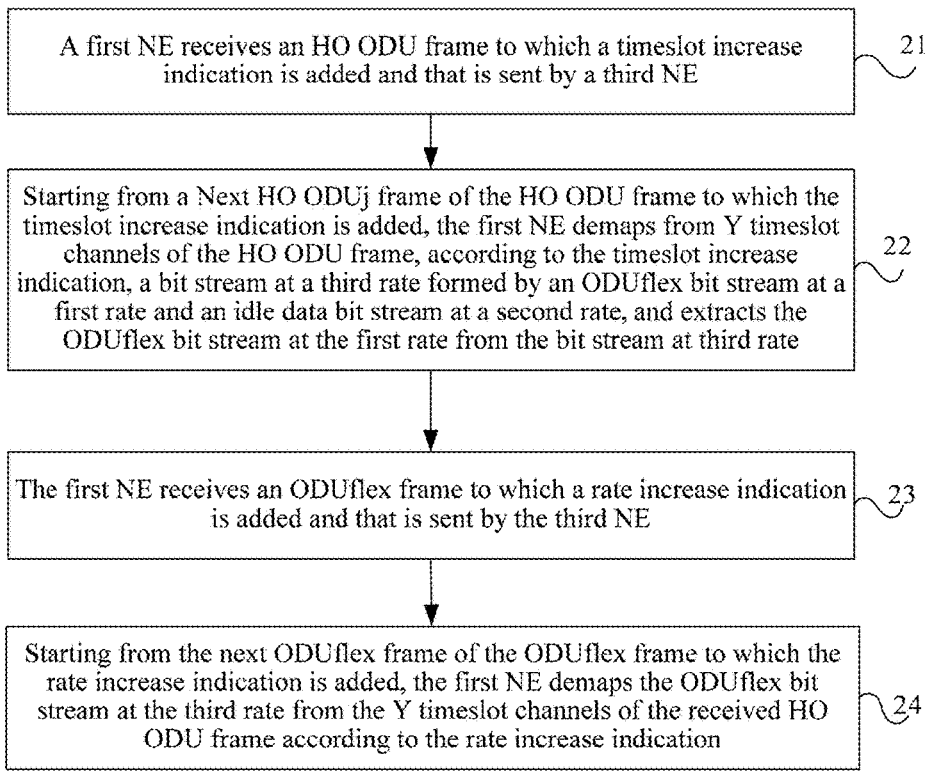
FIG. 2 is a flowchart of another method for increasing optical channel bandwidth according to an embodiment of the present invention.

FIG. 2 is a flowchart of a method for increasing optical channel bandwidth according to an embodiment of the present invention. The method provided in this embodiment is implemented by a receive side of a first NE, and the first NE may be a sink NE in a link through which a service stream flows or may be any intermediate NE in the link. As shown in FIG. 2, the method provided in this embodiment includes:

Step 21: The first NE receives an HO ODU frame to which a timeslot increase indication is added and that is sent by a third NE, where the timeslot increase indication is used to instruct a timeslot, occupied by an ODUflex bit stream, of the HO ODU frame, starting from a next HO ODU frame of the HO ODU frame, to increase from X timeslots to Y timeslots, and X is less than Y. The third NE is an upstream NE of the first NE in a link through which a service stream flows.

After receiving the HO ODU frame, if determining that the HO ODU frame includes the timeslot increase indication, the receive side of the first NE extracts the timeslot increase indication from the HO ODU frame and demaps the ODUflex bit stream from the HO ODU frame according to a GMP method. If the first NE is a sink NE, after the HO ODU frame to which the timeslot increase indication is added is received, a response message that the timeslot increase indication has been received is sent to the upstream NE.

Optionally, the third NE may instruct, in a specified domain of the HO ODU frame, whether the timeslot increase indication is added to a current HO ODU frame. The first NE receives the HO ODU frame and determines, by using a value of the specified domain, whether the timeslot increase indication is added to the current HO ODU frame.

Optionally, the third NE adds the timeslot increase indication to the HO ODU frame and may specify a timeslot increase for one or more ODUflex bit streams borne in the HO ODU frame. If channel bandwidth of multiple ODUflex bit streams is increased, one timeslot increase indication may be added to the HO ODU frame, so as to instruct to increase a timeslot for the multiple ODUflex bit streams; or multiple timeslot increase indications may be added to an overhead of the HO ODU frame, where each timeslot increase indication respectively corresponds to one ODUflex bit stream, and one timeslot increase indication is used to instruct a timeslot, occupied by a corresponding ODUflex bit stream, starting from a next HO ODU frame of the current HO ODU frame, to increase from X timeslots to Y timeslots. A downstream NE receives the HO ODU frame and determines, according to the timeslot increase indication in the HO ODU frame, whether to increase a timeslot occupied by one or more ODUflex bit streams.

Step 22: Starting from a next HO ODUj frame of the HO ODU frame to which the timeslot increase indication is added, the first NE demaps from the Y timeslots of the HO ODU frame according to the timeslot increase indication, a bit stream at a third rate formed by an ODUflex bit stream at a first rate and an idle data bit stream at a second rate, and extracts the ODUflex bit stream at the first rate from the bit stream at third rate.

If extracting the timeslot increase indication from a previous HO ODU frame of the current HO ODU frame, the first NE, starting from the current HO ODU frame, demaps the bit stream at the third rate from the Y timeslots of the HO ODU frame and extracts the ODUflex bit stream at the first rate from the bit stream at the third rate. The bit stream at the third rate is formed by the ODUflex bit stream at the first rate and the idle data bit stream at the second rate. Both the first rate and the second rate are less than the third rate, and the second rate is a difference value between the third rate and the first rate.

Step 23: The first NE receives an ODUflex frame to which a rate increase indication is added and that is sent by the third NE, where the rate increase indication is used to instruct a rate of an ODUflex bit stream, starting from a next ODUflex frame of the ODUflex frame to which the rate increase indication is added, to increase from the first rate to the third rate. A rate corresponding to the Y timeslots of the HO ODU frame is greater than or equal to the third rate, and the ODUflex frame to which the rate increase indication is added is an ODUflex frame bearing the ODUflex bit stream.

When receiving the HO ODU frame, the receive side of the first NE demaps the bit stream at the third rate and extracts, from the bit stream at the third rate, the ODUflex frame, at the first rate, to which the rate increase indication is added. A transmit side of the first NE maps, to the Y timeslots of the HO ODU frame, the bit stream at the third rate formed by the idle data bit stream at the second rate and the ODUflex frame, at the first rate, to which the rate increase indication is added, and sends the HO ODU frame to a downstream NE of the first NE, where the ODUflex frame is extracted by the receive side, and by analogy, until a sink NE receives the ODUflex frame to which the rate increase indication is added.

Starting from the next ODUflex frame of the ODUflex frame to which the rate increase indication is added, the third NE uses the Y timeslots of the HO ODU frame to bear the ODUflex bit stream at the third rate and no longer maps the bit stream at the third rate formed by the ODUflex bit stream at the first rate and the idle data bit stream at the second rate to the Y timeslots of the HO ODU frame.

A rate increase meets the following conditions: The Y timeslots occupied by the ODUflex bit stream at the third rate are capable of bearing the ODUflex bit stream at the third rate. Further, an increase ratio of the rate of the ODUflex bit stream is the same as an increase ratio of the timeslot of the ODUflex bit stream, so that the HO ODU frame bearing the ODUflex bit stream matches the rate of the ODUflex bit stream. For example, the timeslot occupied by the ODUflex bit stream increases from one to two; and accordingly, the rate increases from one time of an ODU 0 rate to two times of the ODU 0 rate. For another example, timeslots occupied by the ODUflex bit stream increase from three to five; and accordingly, the rate increases from three times of the ODU 0 rate to five times of the ODU 0 rate.

Step 24: Starting from the next ODUflex frame of the ODUflex frame to which the rate increase indication is added, the first NE demaps the ODUflex bit stream at the third rate from the Y timeslots of the received HO ODU frame according to the rate increase indication.

If extracting the rate increase indication from a previous ODUflex frame of a current ODUflex frame, the first NE, starting from the current ODUflex frame, demaps the ODUflex bit stream at the third rate from the Y timeslots of the received HO ODU frame.

According to a method for increasing variable optical channel bandwidth provided in this embodiment, starting from a next HO ODU frame, an NE receives, in an increased timeslot according to a timeslot increase indication in a previous HO ODU frame, a bit stream at a high rate formed by an ODUflex bit stream at an original rate and an idle data bit stream at the original rate. After a timeslot, occupied by an ODUflex bit stream, of the HO ODU frame increases in each link segment between a source NE and a sink NE, starting from the next HO ODU, the NE receives an ODUflex bit stream at a high rate in the increased timeslot according to a rate increase indication in a previous ODUflex frame. Therefore, a rate matching between the ODUflex frame and the HO ODU frame to which the ODUflex frame is loaded is implemented, a purpose for a hitless channel bandwidth increase is achieved, and it is not necessary to reserve resources for the ODUflex frame in advance. In a process of increasing a variable optical channel, a change rate and a step size of the number of m-bit client entities are not dependent on; and therefore, a period of increasing the variable optical channel bandwidth is shortened.

Increasing of channel bandwidth of an ODUflex bit stream is used as an example in the following to describe a process of increasing variable optical channel bandwidth. In FIG. 3A to FIG. 3D, NE1 and NE2 are two neighboring NEs in a link from a source NE to a sink NE, where NE1 is an upstream NE of NE2, and NE2 is a downstream NE of NE1.

Figure 3A:
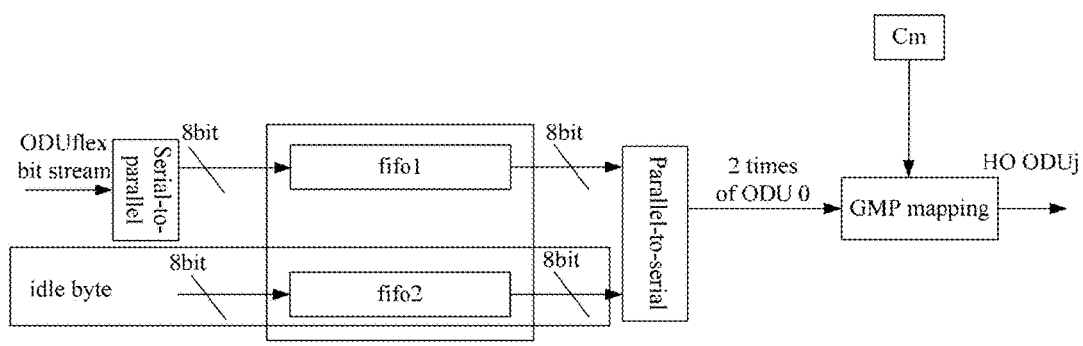
FIG. 3A is a schematic diagram of a process of sending an ODUflex bit stream after a timeslot occupied by the ODUflex bit stream in an HO ODU frame increases according to an embodiment of the present invention.

If NE1 is the source NE, a transmit side of NE1 adds a timeslot increase indication to the $N^{th}$ frame of an HO ODU; and if NE1 is an intermediate NE, a receive side of NE1 extracts a timeslot increase indication from the $N^{th}$ frame of an HO ODUj sent by an upstream NE of NE1, and the transmit side of NE1 adds the timeslot increase indication to the $N^{th}$ frame of the HO ODUj to be sent to NE2. The timeslot increase indication in the $N^{th}$ frame of the HO ODUj is used to instruct a timeslot, occupied by an ODUflex bit stream, of the HO ODUj frame, starting from the $(N+1)^{th}$ frame of the HO ODUj, to increase from one TS to two TSs. As shown in FIG. 3A, the transmit side of NE1, starting from the $(N+1)^{th}$ frame of the HO ODUj, writes an ODUflex bit stream that is at one time of an ODU 0 rate and undergoes serial-to-parallel processing, in FIFO1 of 8 bit width and writes an idle bit stream at one time of the ODU 0 rate in FIFO2 of 8 bit width. Two FIFOs of 8 bit width form one FIFO of 16 bit width.

A bit stream at 8 bit width separately output from FIFO1 and FIFO2 forms, after parallel-to-serial processing, a bit stream at two times of the ODU 0 rate according to a byte interleaving manner. The bit stream at two times of the ODU 0 rate is mapped to two TS channels of the HO ODUj frame in a GMP mapping manner and according to a $C_m$.

Figure 3B:
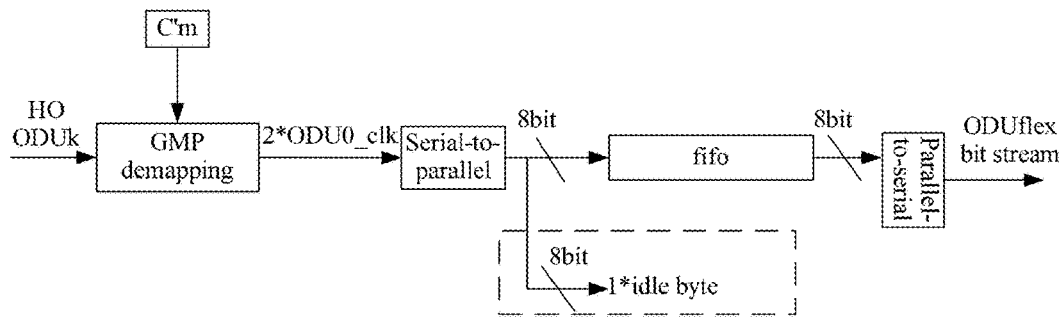
FIG. 3B is a schematic diagram of a process of receiving an ODUflex bit stream after a timeslot occupied by the ODUflex bit stream in an HO ODU frame increases according to an embodiment of the present invention.

When receiving the $N^{th}$ frame of an HO ODUk, a receive side of NE2 parses out a timeslot increase indication from the $N^{th}$ frame of the HO ODUk and demaps an ODUflex bit stream at one time of the ODU 0 rate in one TS by using a GMP mapping method and according to a $C'_m$. Starting from the $(N+1)^{th}$ frame of the HO ODUk, as shown in FIG. 3B, the receive side of NE2 demaps, by using the GMP mapping method and according to the $C'_m$, the bit stream at two times of the ODU 0 rate that is formed, by means of byte interleaving, by an ODUflex bit stream at one time of the ODU 0 rate and an idle bit stream at one time of the ODU 0 rate, removes an idle bit stream at 8 bit width from the bit stream at two times of the ODU 0 rate during serial-to-parallel processing, and extracts the ODUflex bit stream at one time of the ODU 0 rate and 8 bit width and writes it in a FIFO of 8 bit width.

Figure 3C:
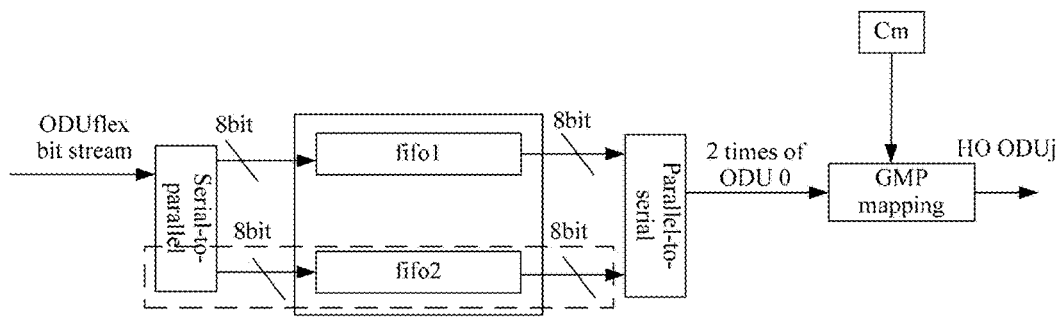
FIG. 3C is a schematic diagram of a process of sending an ODUflex bit stream after a rate of the ODUflex bit stream increases according to an embodiment of the present invention.

After receiving a response message returned by the sink NE, the source NE determines that each NE in the link from the source NE to the sink NE has received the HO ODU frame to which the timeslot increase indication is added. If NE1 is a source NE, NE1 adds a rate increase indication to the $N^{th}$ frame of the ODUflex. If NE1 is an intermediate NE, NE1 extracts a rate increase indication from the $N^{th}$ frame of the ODUflex received from an upstream NE of NE1, adds the rate increase indication extracted on the receive side to the $N^{th}$ frame of the ODUflex to be sent to NE2, maps the $N^{th}$ frame of the ODUflex to two TS channels of the HO ODUj frame, and sends the $N^{th}$ frame of the ODUflex to NE2. As shown in FIG. 3C, on the transmit side of NE1, starting from the $(N+1)^{th}$ frame of the ODUflex, the ODUflex bit stream, after serial-to-parallel processing, is divided into two channels and written in FIFO1 and FIFO2 of 8 bit width. Then, the ODUflex bit stream at two times of the ODU 0 rate is formed after parallel-to-serial processing. The ODUflex bit stream at two times of the ODU 0 rate is mapped, by using the GMP mapping method and according to the $C_m$, to two TS channels of the HO ODU frame and sent to NE2.

Figure 3D:
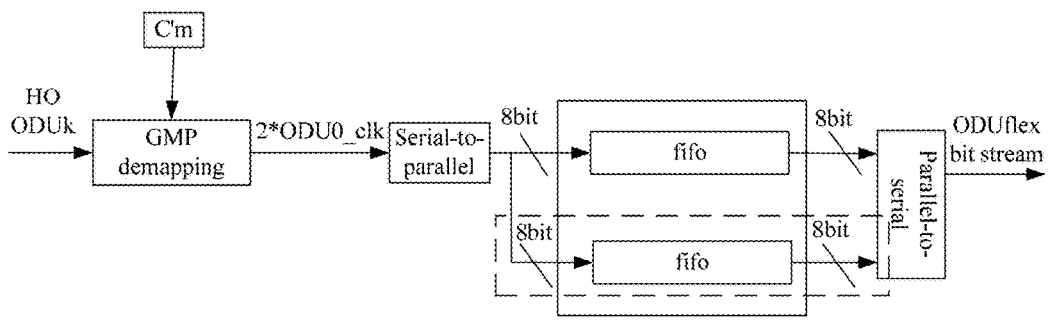
FIG. 3D is a schematic diagram of a process of receiving an ODUflex bit stream after a rate of the ODUflex bit stream increases according to an embodiment of the present invention.

NE2 receives the HO ODU frame sent by NE1, parses out the $N^{th}$ frame of the ODUflex from the two TS channels of the HO ODU frame, and extracts the rate increase indication from the $N^{th}$ frame of the ODUflex. As shown in FIG. 3D, starting from the $(N+1)^{th}$ frame of the ODUflex, the receive side of NE2 demaps the ODUflex bit stream at two times of the ODU 0 rate from the two TSs of the HO ODUk frame by using the GMP mapping method and according to the $C'_m$, and the ODUflex bit stream at two times of the ODU 0 rate, after serial-to-parallel processing, is divided into two channels and separately written in two FIFOs of 8 bit width. The two FIFOs of 8 bit width form a 16-bit FIFO, and parallel width in the serial-to-parallel processing increases from 8 bits to 16 bits.

Figure 3E:
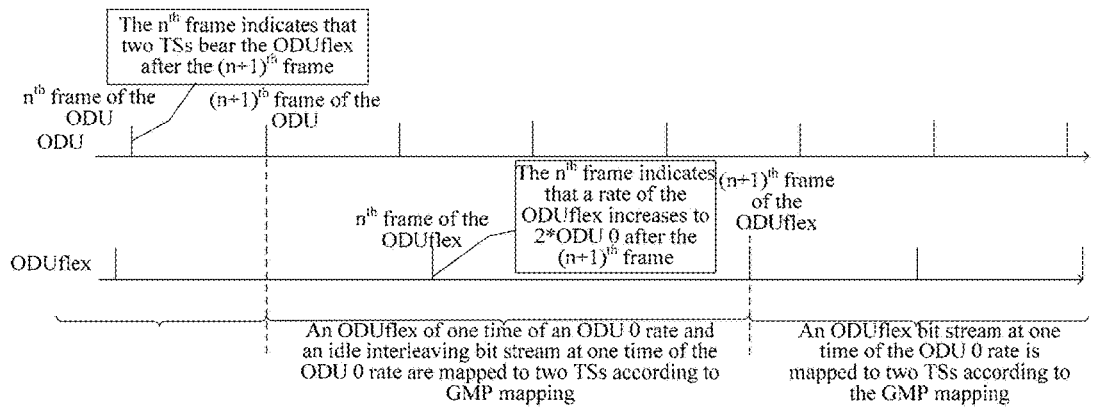
FIG. 3E is a schematic diagram of a process of increasing channel bandwidth of an ODUflex bit stream on a transmit side of an NE according to an embodiment of the present invention.

In an overall process of increasing the channel bandwidth of the ODUflex bit stream shown in FIG. 3E, it is indicated in the $N^{th}$ frame of the HO ODU that starting from the $(N+1)^{th}$ frame of the HO ODU, the HO ODU frame bears the ODUflex bit stream by using two TSs. Before the $(N+1)^{th}$ frame of the HO ODU, the ODUflex bit stream at one time of the ODU 0 rate is mapped to one TS channel of the HO ODU frame. Starting from the $(N+1)^{th}$ frame of the HO ODU, a byte interleaving bit stream of the ODUflex bit stream at one time of the ODU 0 rate and the idle bit stream at one time of the ODU 0 rate is mapped to two TS channels of the HO ODU frame according to the GMP method. It is indicated in the $N^{th}$ frame of the ODUflex that starting from the $(N+1)^{th}$ frame of the ODUflex, a rate of the ODUflex bit stream in the HO ODU frame increases to two times of the ODU 0 rate. Starting from the $(N+1)^{th}$ frame of the ODUflex, the ODUflex bit stream at two times of the ODU 0 rate is mapped to two TS channels of the HO ODU frame.

Figure 4:
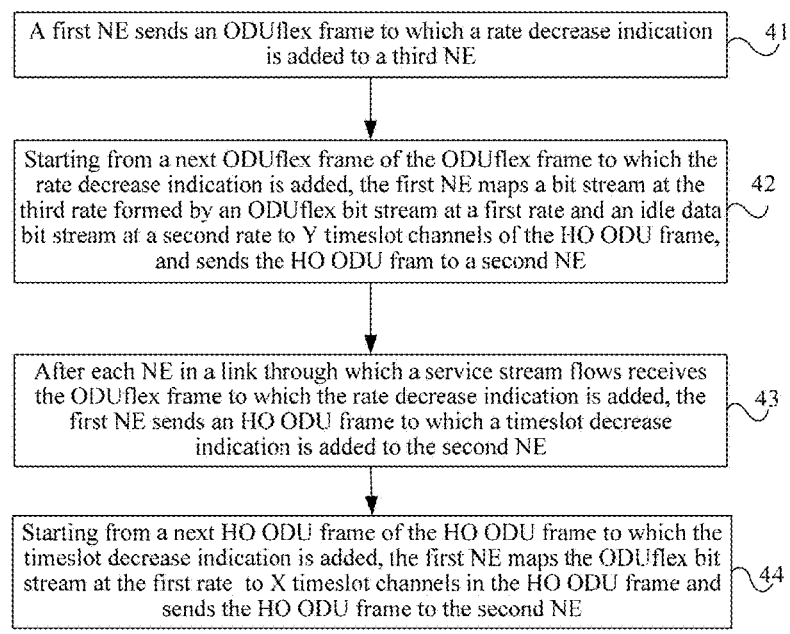
FIG. 4 is a flowchart of a method for decreasing optical channel bandwidth according to an embodiment of the present invention.

FIG. 4 is a flowchart of a method for decreasing optical channel bandwidth according to an embodiment of the present invention. The method provided in this embodiment is implemented by a transmit side of a first NE, and the first NE may be a source NE in a link through which a service stream flows or may be any intermediate NE in the link. As shown in FIG. 4, the method provided in this embodiment includes:

Step 41: The first NE sends an ODUflex frame to which a rate decrease indication is added to a third NE, where the rate decrease indication is used to instruct a rate of an ODUflex bit stream, starting from a next ODUflex frame of the ODUflex frame to which the rate decrease indication is added, to decrease from a third rate to a first rate. The third NE is an upstream NE of the first NE in a link through which a service stream flows.

If the first NE is a source NE, after adding the rate decrease indication to an ODUflex frame to be sent to a second NE, the first NE maps the ODUflex frame to Y timeslots of an HO ODU frame and sends the HO ODU frame to the second NE. If the first NE is an intermediate UE, a receive side demaps the ODUflex frame including the rate decrease indication from an HO ODU frame, and a transmit side maps the ODUflex frame that is demapped on the receive side to the HO ODU frame and sends the HO ODU frame to the second NE, and by analogy, until a sink NE receives the ODUflex frame to which the rate decrease indication is added. The rate decrease indication is added to an overhead of the ODUflex frame, and after demapping the ODUflex frame from the HO ODU frame, the intermediate NE does not modify the ODUflex frame. Therefore, the rate decrease indication is generated from the source NE and is transferred to the sink NE all the way, and the intermediate NE does not modify the rate decrease indication.

To decrease channel bandwidth of multiple ODUflex bit streams simultaneously, the source NE may separately add the rate decrease indication to multiple ODUflex frames of one HO ODU frame, that is, the rate decrease indication is separately added to an ODUflex frame corresponding to each ODUflex bit stream whose rate needs to decrease. Rate decrease indications in different ODUflex frames are used to instruct different ODUflex bit streams, starting from a next ODUflex frame, to decrease a rate.

Step 42: Starting from the next ODUflex frame of the ODUflex frame to which the rate decrease indication is added, the first NE maps a bit stream at the third rate formed by an ODUflex bit stream at the first rate and an idle data bit stream at a second rate to Y timeslots of the HO ODU frame, and sends the HO ODU frame to the second NE.

Starting from the next ODUflex frame of the ODUflex frame to which the rate decrease indication is added, the first NE maps the bit stream at the third rate that is formed by, according to a byte interleaving manner, the ODUflex bit stream at the first rate and the idle data bit stream at the second rate to the Y timeslots of the HO ODU frame. Both the first rate and the second rate are less than the third rate, and the second rate is a difference value between the third rate and the first rate.

After receiving the ODUflex frame to which the rate decrease indication is added, a receive side of the second NE, starting from the next ODUflex frame of the ODUflex frame to which the rate decrease indication is added, demaps the bit stream at the third rate from the Y timeslots of the HO ODU frame according to the rate decrease indication and extracts the ODUflex bit stream at the first rate from the bit stream at the third rate. The bit stream at the third rate is formed by the ODUflex bit stream at the first rate and the idle data bit stream at the second rate, for example, the bit stream at the third rate may be formed by the ODUflex bit stream at the first rate and the idle data bit stream at the second rate according to the byte interleaving manner. The idle data bit stream may be an idle bit stream, for example, a bit stream of all 0s or all 1s.

Step 43: After each NE in the link through which the service stream flows receives the ODUflex frame to which the rate decrease indication is added, the first NE sends an HO ODU frame to which a timeslot decrease indication is added to the second NE, where the timeslot decrease indication is used to instruct a timeslot, occupied by the ODUflex bit stream, of the HO ODU frame, starting from a next HO ODU frame of the HO ODU frame to which the timeslot decrease indication is added, to decrease from Y timeslots to X timeslots, and X is greater than zero and less than Y. A rate corresponding to the X timeslots of the HO ODU frame is greater than or equal to the first rate.

If the first NE is a sink NE, after receiving the HO ODUflex frame to which the rate decrease indication is added, the first NE feeds back a response message that the ODUflex frame has been received to an upstream NE, where the response message is transported to a source NE along a link from a sink node to a source node. After receiving the response message returned by the sink NE, the source NE determines that each NE in the link between the source NE and the sink NE has received the ODUflex frame to which the rate decrease indication is added, and may determine that the rate of the ODUflex bit stream in the HO ODU frame has decreased from the third rate to the first rate in the link between the source NE and the sink NE.

If the first NE is a source NE, after receiving the response message returned by the sink NE, the first NE adds the timeslot decrease indication to an overhead of the HO ODU frame, where the timeslot decrease indication instructs the second NE, starting from the next HO ODU frame of the HO ODU frame to which the timeslot decrease indication is added, to decrease timeslots occupied by the ODUflex bit stream in the HO ODU frame from Y timeslots to X timeslots, the HO ODU frame bears the ODUflex bit stream by using X timeslots, and the ODUflex bit stream at the first rate and the idle data bit stream at the second rate are no longer mapped to the Y timeslots of the HO ODU frame. After an intermediate NE receives the HO ODU frame to which the timeslot decrease indication is added, a transmit side of the intermediate NE adds the timeslot decrease indication extracted on a receive side from an HO ODU frame sent by an upstream NE to an overhead of an HO ODU frame to be sent to a downstream NE of the intermediate NE. A decrease ratio of the timeslot occupied by the ODUflex bit stream is the same as a decrease ratio of the rate of the ODUflex bit stream, so that the HO ODU frame bearing the ODUflex bit stream matches the rate of the ODUflex bit stream. For example, the rate of the ODUflex bit stream decreases from two times of an ODU 0 rate to one time of the ODU 0 rate, and accordingly, timeslots occupied in the HO ODU frame decrease from two timeslots to one timeslot.

If the first NE is the source NE, and the first NE adds the rate decrease indication to multiple ODUflex frames, after the source NE receives the response message returned by the sink NE, the first NE adds multiple timeslot decrease indications to the HO ODU frame, where the multiple timeslot decrease indications separately instruct timeslots occupied by different ODUflex bit streams to decrease; or the source NE may add one timeslot indication to the HO ODU frame, where the timeslot indication instructs timeslot occupied by multiple ODUflex bit stream to decrease.

Step 44: Starting from the next HO ODU frame of the HO ODU frame to which the timeslot decrease indication is added, the first NE maps the ODUflex bit stream at the first rate to the X timeslots in the HO ODU frame and sends the HO ODU frame to the second NE.

Starting from the next HO ODU frame of the HO ODU frame to which the timeslot decrease indication is added, the first NE decreases the timeslot occupied by the ODUflex bit stream borne in the HO ODU frame, maps the ODUflex bit stream at the first rate to the X timeslots in the HO ODU frame, and sends the HO ODU frame to the second NE.

According to a method for decreasing variable optical channel bandwidth provided in this embodiment, an NE sends, in a current ODUflex frame, a rate decrease indication to a downstream NE, and starting from a next ODUflex frame to be sent to the downstream NE, decreases a rate of an ODUflex bit stream; and then, adds a timeslot decrease indication to a current HO ODU frame, and starting from a next HO ODU frame, decreases a timeslot occupied by the ODUflex frame in the HO ODU frame. In a process of increasing a variable optical channel, a change rate and a step size of the number of m-bit client entities are not dependent on; and therefore, a period of decreasing the variable optical channel bandwidth is shortened. In a phase of rate decreasing, in an original timeslot occupied by a bit stream at an original rate in the HO ODU frame, a bit stream at a high rate formed by an ODUflex bit stream at a low rate and an idle data bit stream to the downstream NE. After a rate of an ODUflex bit stream in each link segment between a source NE and a sink NE decreases, the ODUflex bit stream at a low rate is sent, in the HO ODU frame after a timeslot is decreased, to the downstream NE, so that a rate matching between the ODUflex frame and the HO ODU frame to which the ODUflex frame is loaded is implemented, and a purpose for a hitless channel bandwidth decrease is achieved.

Figure 5:
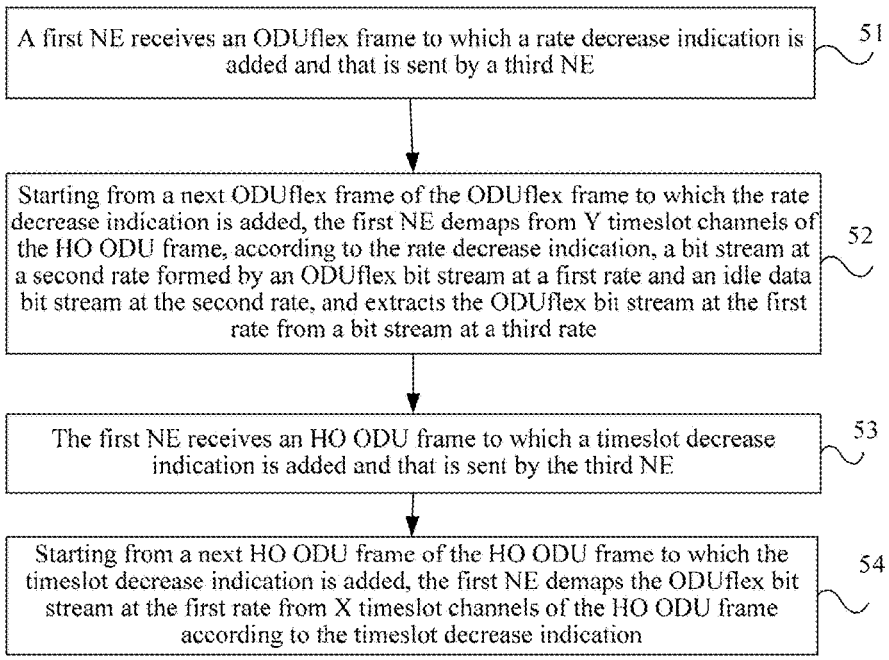
FIG. 5 is a flowchart of another method for decreasing optical channel bandwidth according to an embodiment of the present invention.

FIG. 5 is a flowchart of another method for decreasing optical channel bandwidth according to an embodiment of the present invention. The method provided in this embodiment is implemented by a receive side of a first NE, and the first NE may be a sink NE in a link through which a service stream flows or may be any intermediate NE in the link. As shown in FIG. 5, the method provided in this embodiment includes:

Step 51: The first NE receives an ODUflex frame to which a rate decrease indication is added and that is sent by a third NE, where the rate decrease indication is used to instruct a rate of an ODUflex bit stream, starting from a next ODUflex frame of the ODUflex frame to which the rate decrease indication is added, to decrease from a third rate to a first rate. The third NE is an upstream NE of the first NE in the link, and a second NE is a downstream NE of the first NE in the link.

After receiving an HO ODU frame sent by the third NE, the receive side of the first NE demaps, according to a GMP mapping method, an ODUflex bit stream borne in the HO ODU frame; a transmit side of the first NE maps an ODUflex frame demapped on the receive side to the HO ODU frame and sends the HO ODU frame to the second NE; and by analogy, until a sink NE receives the ODUflex frame to which the rate decrease indication is added. If the first NE is the sink NE, after receiving the rate decrease indication, the first NE sends a response message that the rate decrease indication has been received to the third NE. The response message is to be transmitted along a link from the sink NE to a source NE until the source NE receives the response message.

Step 52: Starting from the next ODUflex frame of the ODUflex frame to which the rate decrease indication is added, the first NE demaps from Y timeslots of the HO ODU frame, according to the rate decrease indication, a bit stream at a third rate formed by an ODUflex bit stream at a first rate and an idle data bit stream at the second rate, and extracts the ODUflex bit stream at the first rate from the bit stream at the third rate.

After receiving the ODUflex frame including the rate decrease indication, the first NE, starting from the next ODUflex frame, demaps, from the Y timeslots of the HO ODU frame, the bit stream at the third rate formed by the ODUflex bit stream at the first rate and the idle data bit stream at the second rate, and extracts the ODUflex bit stream at the first rate from the bit stream at third rate. The bit stream at the second rate may be a bit stream formed by the ODUflex bit stream at the first rate and the idle data bit stream at the second rate according to a byte interleaving manner. Y is the number of timeslots occupied by the ODUflex bit stream in the HO ODU frame. Both the first rate and the second rate are less than the third rate, and the second rate is a difference value between the third rate and the first rate.

Step 53: The first NE receives an HO ODU frame to which a timeslot decrease indication is added and that is sent by the third NE, where the timeslot decrease indication is used to instruct a timeslot, occupied by the ODUflex bit stream, of the HO ODU frame, starting from a next HO ODU frame of the HO ODU frame to which the timeslot decrease indication is added, to decrease from Y timeslots to X timeslots, where X is greater than zero and less than Y. A rate corresponding to the X timeslots of the HO ODU frame is greater than or equal to the first rate.

The third NE instructs, by using the timeslot decrease indication in the HO ODU frame, the first NE that the timeslots occupied by the ODUflex bit stream of the HO ODU frame decrease from Y timeslots to X timeslots. X timeslots occupied by the ODUflex bit stream at the first rate are capable of bearing the ODUflex bit stream at the first rate. Further, a decrease ratio of the timeslot occupied by the ODUflex bit stream is the same as a decrease ratio of the rate of the ODUflex bit stream, so that the HO ODU bearing the ODUflex bit stream matches the rate of the ODUflex bit stream.

Step 54: Starting from the next HO ODU frame of the HO ODU frame to which the timeslot decrease indication is added, the first NE demaps the ODUflex bit stream at the first rate from the X timeslots of the HO ODU frame according to the timeslot decrease indication.

If receiving the timeslot decrease indication in a current HO ODU frame, the first NE, starting from a next HO ODU frame of the current HO ODU frame, demaps the ODUflex bit stream at the first rate from the X timeslots of the HO ODU frame, achieving a purpose for decreasing variable rate channel bandwidth.

According to a method for decreasing variable optical channel bandwidth provided in this embodiment, an NE first receives, in an HO ODU frame according to a rate decrease indication in an ODUflex frame, a bit stream at a high rate formed by an ODUflex bit stream at a low rate and an idle data bit stream. After an HO ODU frame including a timeslot decrease indication is received, starting from a next HO ODU frame, the ODUflex bit stream at a low rate is received in a timeslot of the decreased HO ODU frame. Therefore, a rate matching between the ODUflex frame and the HO ODU frame to which the ODUflex frame is loaded is implemented, and a purpose for a hitless bandwidth decrease of an ODUflex bit stream channel is achieved. In a process of increasing a variable optical channel, a change rate and a step size of the number of m-bit client entities are not dependent on; and therefore, a period of decreasing the variable optical channel bandwidth is shortened.

Decreasing of channel bandwidth of the ODUflex bit stream is used as an example in the following to describe a process of increasing variable optical channel bandwidth. In FIG. 6A to FIG. 6D, NE1 and NE2 are two neighboring NEs in a link from a source NE to a sink NE, where NE1 is an upstream NE of NE2, and NE2 is a downstream NE of NE1.

Figure 6A:
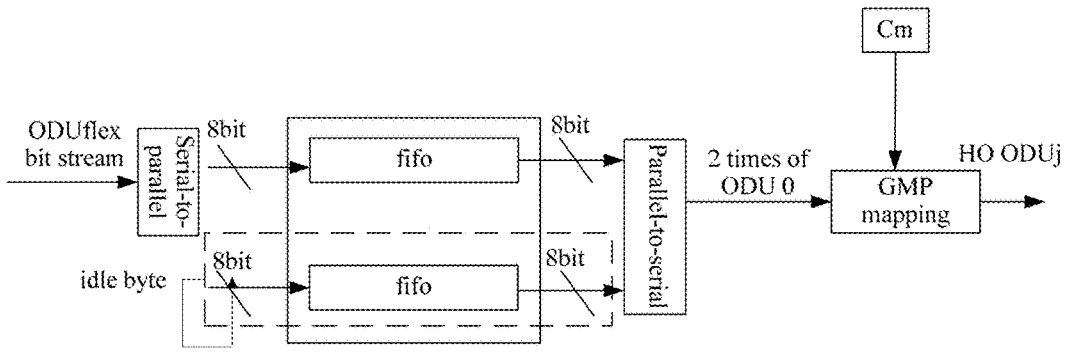
FIG. 6A is a schematic diagram of a process of sending an ODUflex bit stream after a rate of the ODUflex bit stream decreases according to an embodiment of the present invention.

NE1 adds a rate decrease indication to an overhead of the $N^{th}$ frame of an ODUflex, where the rate decrease indication instructs a rate of an ODUflex bit stream, starting from the $(N+1)^{th}$ frame of the ODUflex, to decrease from two times of ODU 0 to one time of ODU 0. As shown in FIG. 6A, starting from the $(N+1)^{th}$ frame of the ODUflex, a transmit side of NE1 performs serial-to-parallel processing for the ODUflex bit stream at one time of an ODU 0 rate, then writes the ODUflex bit stream at one time of the ODU 0 rate in FIFO1 of 8 bit width, and writes an idle bit stream at one time of the ODU 0 rate in FIFO2 of 8 bit width. A bit stream at 8 bit width separately output from FIFO1 and FIFO2 forms, after parallel-to-serial processing, a bit stream at two times of the ODU 0 rate according to a byte interleaving manner. The bit stream at two times of the ODU 0 rate is mapped to two TS channels of an HO ODUj frame in a GMP mapping manner and according to a $C_m$.

Figure 6B:
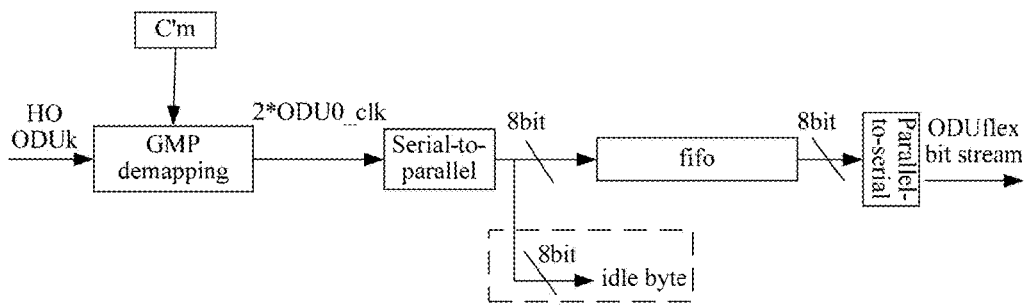
FIG. 6B is a schematic diagram of a process of receiving an ODUflex bit stream after a rate of the ODUflex bit stream decreases according to an embodiment of the present invention.

After receiving the $N^{th}$ frame of the ODUflex, a receive side of NE2 extracts the rate decrease indication. Before the $(N+1)^{th}$ frame of the ODUflex, the ODUflex bit stream at two times of the ODU 0 rate is demapped from the two TS channels by using a GMP mapping method and according to a $C'_m$. As shown in FIG. 6B, starting from the $(N+1)^{th}$ frame of the ODUflex, the receive side of NE2 demaps, from the two TS channels and according to the rate decrease indication in the $N^{th}$ frame of the ODUflex and by using the GMP mapping method and according to the $C'_m$, the bit stream at two times of the ODU 0 rate that is formed, by means of byte interleaving, by the ODUflex bit stream at one time of the ODU 0 rate and the idle bit stream at one time of the ODU 0 rate; removes an idle bit stream at 8 bit width from the bit stream at two times of the ODU 0 rate during the serial-to-parallel processing, and extracts and writes the ODUflex bit stream at one time of the ODU 0 rate and of 8 bit width in an FIFO of 8 bit width.

Figure 6C:
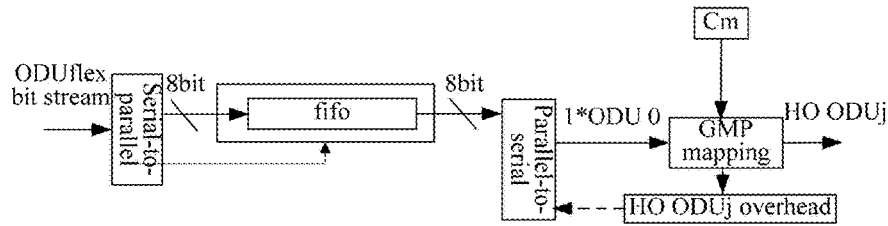
FIG. 6C is a schematic diagram of a process of sending an ODUflex bit stream after a timeslot occupied by the ODUflex bit stream in an HO ODU frame decreases according to an embodiment of the present invention.

After receiving a response message, returned by the sink NE, that the rate decrease indication has been received, the source NE determines that each NE in a link from the source NE to the sink NE has received the ODUflex frame to which the rate decrease indication is added. If NE1 is a source NE, NE1 adds a timeslot decrease indication to the $N^{th}$ frame of an HO ODU, where the timeslot decrease indication instructs a downstream NE, starting from the $(N+1)^{th}$ frame of the HO ODU, to decrease timeslots occupied by an ODUflex bit stream in the HO ODU frame from two timeslots to one timeslot, and cancels using the byte interleaving manner to form a bit stream. If NE1 is an intermediate NE, NE1 extracts the timeslot decrease indication from the $N^{th}$ frame of an HO ODU received from an upstream NE of NE1, and adds the timeslot decrease indication extracted on the receive side to the $N^{th}$ frame of an HO ODU to be sent to NE2 and sends the HO ODU to NE2. As shown in FIG. 6C, starting from the $(N+1)^{th}$ frame of the HO ODU, NE1 performs the serial-to-parallel processing for an ODUflex bit stream and writes the ODUflex bit stream in an FIFO of 8 bit width. An ODUflex bit stream of 8 bit width output from the FIFO, after the serial-to-parallel processing, forms an ODUflex bit stream at one time of the ODU 0 rate, and then is mapped to one TS of the HO ODU frame in the GMP mapping manner and according to the $C_m$.

Figure 6D:
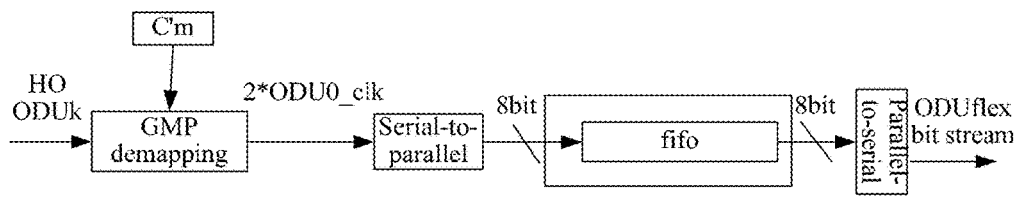
FIG. 6D is a schematic diagram of a process of receiving an ODUflex bit stream after a timeslot occupied by the ODUflex bit stream in an HO ODU frame decreases according to an embodiment of the present invention.

NE2 receives the $N^{th}$ frame of the HO ODU and extracts the timeslot decrease indication. Before the $(N+1)^{th}$ frame of the HO ODU, NE1 demaps, from the two TS channels of the HO ODU frame, the bit stream at two times of the ODU 0 rate that is formed by, by means of byte interleaving, the ODUflex bit stream at one time of the ODU 0 rate and the idle bit stream at one time of the ODU 0 rate, and extracts the ODUflex bit stream at one time of the ODU 0 rate and of 8 bit width from the bit stream at two times of the ODU 0 rate. As shown in FIG. 6D, starting from the $(N+1)^{th}$ frame of the HO ODU, NE1 demaps, on one TS channel, the ODUflex bit stream at one time of the ODU 0 rate from the HO ODUk frame by using the GMP mapping method and according to the $C'_m$. The ODUflex bit stream at one time of the ODU 0 rate is input, after the serial-to-parallel processing, to the FIFO of 8 bit width, and then parallel-to-serial processing is performed for the FIFO of 8 bit width.

Figure 6E:
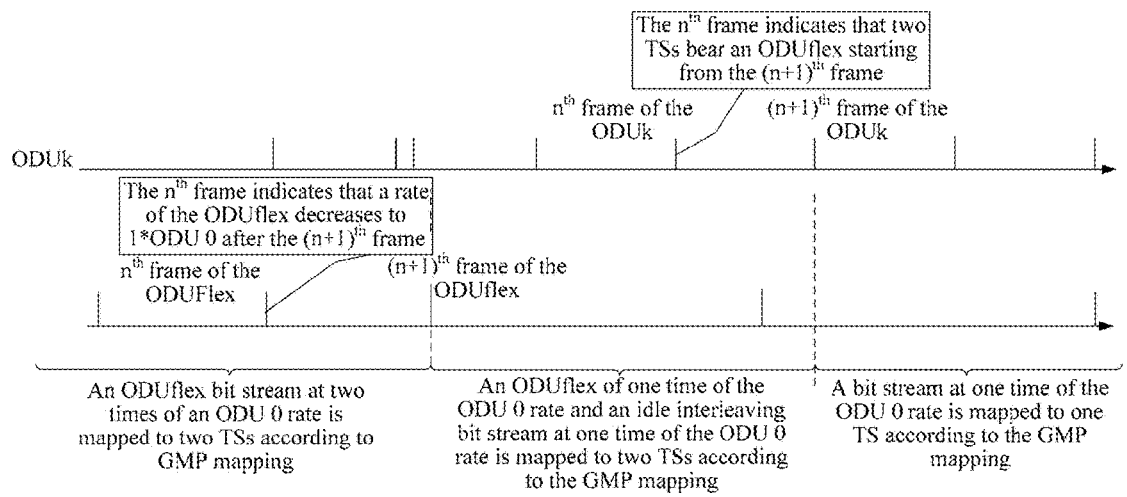
FIG. 6E is a schematic diagram of a process of decreasing channel bandwidth of an ODUflex bit stream on a transmit side of an NE according to an embodiment of the present side.

In an overall process of decreasing, by a transmit side of an NE, channel bandwidth of an ODUflex bit stream shown in FIG. 6E, the transmit side adds a rate decrease indication to the $N^{th}$ frame of an ODUflex, where the rate decrease indication instructs a rate of an ODUflex bit stream, starting from the $(N+1)^{th}$ frame of the ODUflex, to decrease from two times of an ODU 0 to one time of the ODU 0. Before the $(N+1)^{th}$ frame of the ODUflex, an ODUflex bit stream at two times of an ODU 0 rate is mapped to two TS channels of an HO ODU frame. Starting from the $(N+1)^{th}$ frame of an HO ODU, a bit stream formed by an ODUflex bit stream at one time of the ODU 0 rate and idle of the ODU 0 rate according to byte interleaving is mapped to two TSs of the HO ODU frame. A timeslot decrease indication is added to the $N^{th}$ frame of the HO ODU, where the timeslot decrease indication instructs timeslots occupied by the ODUflex bit stream, starting from the $(N+1)^{th}$ frame of the HO ODU, to decrease from two TSs to one TS. Before the $(N+1)^{th}$ frame of the HO ODU, the transmit side maps, to two TSs of the HO ODU frame, the bit stream that is formed by the ODUflex bit stream at one time of the ODU 0 rate and the idle of the ODU 0 rate according to byte interleaving. Starting from the $(N+1)^{th}$ frame of the HO ODU, the transmit side maps the ODUflex bit stream at one time of the ODU 0 rate to one TS channel of the HO ODU frame.

A method for increasing optical channel bandwidth and a method for decreasing optical channel bandwidth that are provided in the embodiments of the present invention may enable multiple ODUflexes to share a cache, lowering cache requirements in an ODUflex bandwidth adjustment and reducing bit width requirements of a cache interface. It is assumed that an HO ODUk is an ODU 3, whose rate is approximately 40 Gbps, the HO ODUk contains 32 TSs, and the HO ODUk bears two ODUflexes. According to the methods provided in the embodiments of the present invention, two FIFOs of 8 bit width may be combined into an FIFO of 16 bit width, and each TS has one FIFO that may serve as a cache queue of two bit streams. Before the bandwidth adjustment, an ODUflex1 occupies 11 TSs, that is, 11 FIFOs of 8 bit width are occupied to temporarily store, and an ODUflex2 occupies 20 TSs, that is, 20 FIFOs of 8 bit width are occupied to cache data. After the bandwidth adjustment, the ODUflex1 occupies eight TSs, and three FIFOs of 8 bit width are freed and provided for the ODUflex2; and the ODUflex2 occupies 24 TSs, that is, 24 FIFOs of 8 bit width are occupied, of which three FIFOs are provided by the ODUflex1, and one FIFO is idle. Each ODUflex needs 32 FIFOs of 8 bit width to serve as a cache queue in the prior art.

Figure 7:
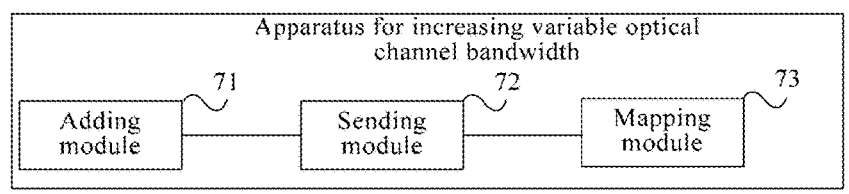
FIG. 7 is a schematic structural diagram of an apparatus for increasing a variable optical channel according to an embodiment of the present invention.

FIG. 7 is a schematic structural diagram of an apparatus for increasing variable optical channel bandwidth according to an embodiment of the present invention. The apparatus provided in this embodiment is a transmit side of an NE and is applicable to a scenario of increasing variable optical channel bandwidth. As shown in FIG. 7, the apparatus provided in this embodiment includes: an adding module 71, a sending module 72, and a mapping module 73.

The adding module 71 is configured to add a timeslot increase indication to an HO ODU frame, where the timeslot increase indication is used to instruct a timeslot, occupied by an ODUflex bit stream, of the HO ODU frame, starting from a next HO ODU frame of the HO ODU frame, to increase from X timeslots to Y timeslots, and X is greater than zero and less than Y.

The sending module 72 is configured to send the HO ODU frame to which the timeslot increase indication is added by the adding module to a second NE, where the second NE is a downstream NE of an NE on which the apparatus is located in a link through which a service stream flows.

The mapping module 73 is configured to, after the sending module sends the HO ODU frame to which the timeslot increase indication is added to the second NE, starting from the next HO ODU frame of the HO ODU frame to which the timeslot increase indication is added, map a bit stream at a third rate formed by an ODUflex bit stream at the first rate and an idle data bit stream at a second rate to Y timeslots of the HO ODU frame, where both the first rate and the second rate are less than the third rate, and the second rate is a difference value between the third rate and the first rate.

The sending module 72 is further configured to send the HO ODU frame mapped by the mapping module to the second NE.

The mapping module 73 is further configured to, after each NE in the link receives the HO ODU frame to which the timeslot increase indication is added, map an ODUflex frame to which a rate increase indication is added to the HO ODU frame, where the ODUflex frame to which the rate increase indication is added is an ODUflex frame bearing the ODUflex bit stream, the rate increase indication is used to instruct a rate of the ODUflex bit stream, starting from a next ODUflex frame of the ODUflex frame to which the rate increase indication is added, to increase from the first rate to the third rate, and Y timeslots occupied by the ODUflex bit stream at the third rate are capable of bearing the ODUflex bit stream at the third rate.

The mapping module 73 is further configured to, starting from the next ODUflex frame of the ODUflex frame to which the rate increase indication is added, map the ODUflex bit stream at the third rate to Y timeslots of the HO ODU frame. Further, the mapping module is further configured to, starting from the next HO ODU frame of the HO ODU frame to which the timeslot increase indication is added, map the bit stream at the third rate that is formed by, according to a byte interleaving manner, the ODUflex bit stream at the first rate and the idle data bit stream at the second rate to the Y timeslots of the HO ODU frame.

Optionally, the adding module is specifically configured to, if the apparatus is an intermediate NE or arranged inside the intermediate NE, and if the timeslot increase indication is added to an HO ODU frame that is received from a third NE, add the timeslot increase indication extracted from the received HO ODU frame to an HO ODU frame to be sent to a downstream NE, where the third NE is an upstream NE of the NE on which the apparatus is located in the link.

Optionally, the adding module is further configured to, if the apparatus is a source NE or arranged inside the source NE, after receiving response information, returned by a sink NE, that the HO ODU frame to which the timeslot increase indication is added has been received, add the rate increase indication to the ODUflex frame.

For functions of each module described above, refer to the description in the embodiment corresponding to FIG. 1A, and details are not described herein again.

In the foregoing technical solutions, an apparatus for increasing variable optical channel bandwidth sends, in a current HO ODU frame, a timeslot increase indication of an ODUflex bit stream to a downstream NE, and starting from a next HO ODU frame, sends, in an increased timeslot in the HO ODU frame, a bit stream at a high rate formed by an ODUflex bit stream at an original rate and an idle data bit stream to the downstream NE. Then, a rate increase indication is sent, in an ODUflex frame, to the downstream NE, and starting from a next ODUflex frame, an ODUflex bit stream at a high rate is sent, in the increased timeslot in the HO ODU frame, to the downstream NE. In a process of increasing a variable optical channel, a change rate and a step size of the number of m-bit client entities are not dependent on; and therefore, a period of increasing the variable optical channel bandwidth is shortened. In a phase of timeslot increasing, the apparatus for increasing variable optical channel bandwidth sends, in the HO ODU frame after a timeslot is increased, a bit stream at a high rate formed by an ODUflex bit stream and an idle data bit stream to the downstream NE, and after a timeslot, occupied by the ODUflex bit stream, of the HO ODU frame increases in each link segment between a source NE and a sink NE, sends an ODUflex bit stream at a high rate to the downstream NE, so that a rate matching between the ODUflex frame and the HO ODU frame to which the ODUflex frame is loaded is implemented, a purpose for a hitless channel bandwidth increase is achieved, and it is not necessary to reserve resources for the ODUflex frame in advance.

Figure 8:
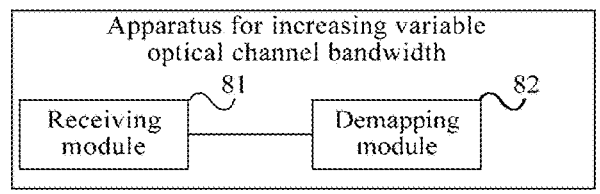
FIG. 8 is a schematic structural diagram of another apparatus for increasing a variable optical channel according to an embodiment of the present invention.

FIG. 8 is a schematic structural diagram of an apparatus for increasing variable optical channel bandwidth according to an embodiment of the present invention. The apparatus provided in this embodiment is located on a receive side of an NE and is applicable to a scenario of increasing channel bandwidth. As shown in FIG. 8, the apparatus provided in this embodiment includes: a receiving module 81 and a demapping module 82.

The receiving module 81 is configured to receive an HO ODU frame to which a timeslot increase indication is added and that is sent by a third NE, where the timeslot increase indication is used to instruct a timeslot, occupied by an ODUflex bit stream, of the HO ODU frame, starting from a next HO ODU frame of the HO ODU frame, to increase from X timeslots to Y timeslots, where X is less than Y, and the third NE is an upstream NE of an NE on which the apparatus is located in a link through which a service stream flows.

The demapping module 82 is configured to, starting from a next HO ODUj frame of an HO ODUj frame to which the timeslot increase indication is added, demap from Y timeslots of the HO ODU frame, according to the timeslot increase indication received by the receiving module, a bit stream at a third rate formed by an ODUflex bit stream at the first rate and an idle data bit' stream at a second rate, and extract the ODUflex bit stream at the first rate from the bit stream at the third rate, where both the first rate and the second rate are less than the third rate, and the second rate is a difference value between the third rate and the first rate.

The receiving module 81 is further configured to receive an ODUflex frame to which a rate increase indication is added and that is sent by the third NE, where the rate increase indication is used to instruct a rate of the ODUflex bit stream, starting from a next HO ODUflex frame of the HO ODUflex frame to which the rate increase indication is added, to increase from the first rate to the third rate, where Y timeslots occupied by the ODUflex bit stream at the third rate are capable of bearing the ODUflex bit stream at the third rate, and the ODUflex frame to which the rate increase indication is added is an ODUflex frame bearing the ODUflex bit stream.

The demapping module 82 is further configured to, starting from the next ODUflex frame of the ODUflex frame to which the rate increase indication is added, demap the ODUflex bit stream at the third rate from Y timeslots of the received HO ODU frame according to the rate increase indication received by the receiving module.

Optionally, the apparatus further includes a sending module if the apparatus is a sink NE or arranged inside a sink NE. The sending module is configured to, after the receiving module receives the HO ODU frame to which the timeslot increase indication is added and that is sent by the third NE, if the apparatus is a sink NE or arranged inside the sink NE, send response information that the timeslot increase indication has been received to the third NE.

Optionally, the bit stream at the third rate is a bit stream formed by the ODUflex bit stream at the first rate and the idle data bit stream at the second rate according to a byte interleaving manner.

Optionally, an increase ratio of the rate of the ODUflex bit stream is the same as an increase ratio of the timeslot of the ODUflex.

For functions of each module described above, refer to the description in the embodiment corresponding to FIG. 2, and details are not described herein again.

In the foregoing technical solutions, starting from a next HO ODU frame, an apparatus receives, in an increased timeslot according to a timeslot increase indication in a previous HO ODU frame, a bit stream at a high rate formed by an ODUflex bit stream at an original rate and an idle data bit stream at an original rate. After a timeslot, occupied by an ODUflex bit stream, of the HO ODU frame increases in each link segment between a source NE and a sink NE, starting from the next HO ODU, the NE receives an ODUflex bit stream at a high rate in the increased timeslot according to a rate increase indication in a previous ODUflex frame. Therefore, a rate matching between the ODUflex frame and the HO ODU frame to which the ODUflex frame is loaded is implemented, a purpose for a hitless channel bandwidth increase is achieved, and it is not necessary to reserve resources for the ODUflex frame in advance. In a process of increasing a variable optical channel, a change rate and a step size of the number of m-bit client entities are not dependent on; and therefore, a period of increasing the variable optical channel bandwidth is shortened.

Figure 9:
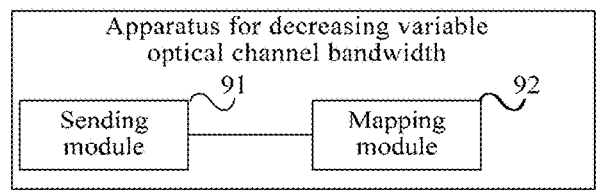
FIG. 9 is a schematic structural diagram of an apparatus for decreasing a variable optical channel according to an embodiment of the present invention.

FIG. 9 is a schematic structural diagram of an apparatus for decreasing variable optical channel bandwidth according to an embodiment of the present invention. The apparatus provided in this embodiment is located on a transmit side and is applicable to a scenario of decreasing variable optical channel bandwidth. As shown in FIG. 9, the apparatus provided in this embodiment includes: a sending module 91 and a mapping module 92.

The sending module 91 is configured to send an ODUflex frame to which a rate decrease indication is added to a second NE, where the rate decrease indication is used to instruct a rate of an ODUflex bit stream, starting from a next ODUflex frame of the ODUflex frame to which the rate decrease indication is added, to decrease from a third rate to a first rate, and the second NE is a downstream NE of the first NE in a link through which a service stream flows.

The mapping module 92 is configured to, starting from the next ODUflex frame of the ODUflex frame to which the rate decrease indication is added, map a bit stream at the third rate formed by an ODUflex bit stream at the first rate and an idle data bit stream at a second rate to Y timeslots of an HO ODU frame, where the second rate is less than the third rate, and the second rate is a difference value between the third rate and the first rate.

An adding module 93 is configured to, after each NE in the link receives the ODUflex frame to which the rate decrease indication is added, add a timeslot decrease indication to the HO ODU frame, where the timeslot decrease indication is used to instruct a timeslot, occupied by the ODUflex bit stream, of the HO ODU frame, starting from a next HO ODU frame of the HO ODU frame to which the timeslot decrease indication is added, to decrease from Y timeslots to X timeslots, X is greater than zero and less than Y, and the X timeslots occupied by the ODUflex bit stream at the first rate are capable of bearing the ODUflex bit stream at the first rate.

The sending module 91 is further configured to send the HO ODU frame to which the timeslot decrease indication is added to the second NE.

The mapping module 92 is further configured to, starting from the next HO ODU frame of the HO ODU frame to which the timeslot decrease indication is added, map the ODUflex bit stream at the first rate to X timeslots of the HO ODU frame.

The sending module 91 is further configured to send the HO ODU frame after the mapping by the mapping module to the second NE.

Optionally, the adding module is further configured to, if the apparatus is a source NE or arranged inside the source NE, before sending the ODUflex frame to which the rate decrease indication is added to the second NE, add the rate decrease indication to the ODUflex frame to be sent to the downstream NE.

Optionally, the adding module is further configured to, if the apparatus is the source NE or arranged inside the source NE, after receiving response information, returned by a sink NE, that the ODUflex frame to which the rate decrease indication is added has been received, add the timeslot decrease indication to the HO ODU frame.

Optionally, if the apparatus is an intermediate NE or arranged inside the intermediate NE, and a received HO ODU frame sent by a third NE includes the timeslot decrease indication, the timeslot decrease indication extracted from the HO ODU frame sent by the third NE is added to the HO ODU to be sent to the second NE, where the third NE is an upstream NE of the first NE in the link through which the service stream flows.

Optionally, the mapping module is further configured to, starting from the next HO ODU frame of the HO ODU frame to which the timeslot decrease indication is added, map the bit stream at the third rate that is formed by, according to a byte interleaving manner, the ODUflex bit stream at the first rate and the idle data bit stream at the second rate to the Y timeslots of the HO ODU frame.

Optionally, a decrease ratio of the timeslot occupied by the ODUflex bit stream is the same as a decrease ratio of the rate of the ODUflex bit stream.

For functions of each module described above, refer to the description in the embodiment corresponding to FIG. 4, and details are not described herein again.

In the foregoing technical solutions, an NE sends, in a current ODUflex frame, a rate decrease indication to a downstream NE, and starting from a next ODUflex frame sent to the downstream NE, decreases a rate of an ODUflex bit stream; and then, adds a timeslot decrease indication to a current HO ODU frame, and starting from a next HO ODU frame, decreases a timeslot occupied by the ODUflex frame in the HO ODU frame. In a process of increasing a variable optical channel, a change rate and a step size of the number of m-bit client entities are not dependent on; and therefore, a period of decreasing variable optical channel bandwidth is shortened. In a phase of rate decreasing, in an original timeslot occupied by a bit stream at an original rate in the HO ODU frame, a bit stream at a high rate formed by an ODUflex bit stream at a low rate and an idle data bit stream to the downstream NE. After a rate of an ODUflex bit stream in each link segment between a source NE and a sink NE decreases, the ODUflex bit stream at a low rate is sent, in the HO ODU frame after a timeslot is decreased, to the downstream NE, so that a rate matching between the ODUflex frame and the HO ODU frame to which the ODUflex frame is loaded is implemented, and a purpose for a hitless channel bandwidth decrease is achieved.

Figure 10:
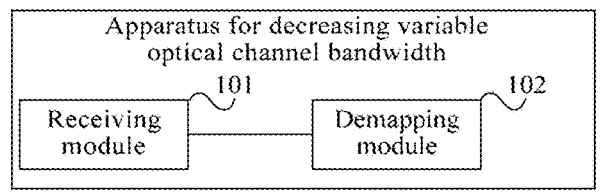
FIG. 10 is a schematic structural diagram of another apparatus for decreasing a variable optical channel according to an embodiment of the present invention.

FIG. 10 is a schematic structural diagram of an apparatus for decreasing variable optical channel bandwidth according to an embodiment of the present invention. The apparatus provided in this embodiment is located on a receive side of an NE and is applicable to a scenario of decreasing variable optical channel bandwidth. As shown in FIG. 10, the apparatus provided in this embodiment includes: a receiving module 101 and a demapping module 102.

The receiving module 101 is configured to receive an ODUflex frame to which a rate decrease indication is added and that is sent by a third NE, where the rate decrease indication is used to instruct a rate of an ODUflex bit stream, starting from a next ODUflex frame of the ODUflex frame to which the rate decrease indication is added, to decrease from a third rate to a first rate, where the third NE is an upstream NE of the first NE in a link through which a service stream flows.

The demapping module 102 is configured to, starting from the next ODUflex frame of the ODUflex frame to which the rate decrease indication is added, demap from Y timeslots of an HO ODU frame, according to the rate decrease indication, a bit stream at the third rate formed by an ODUflex bit stream at the first rate and an idle data bit stream at a second rate, and extract the ODUflex bit stream at the first rate from the bit stream at the third rate, where the second rate is a difference value between the third rate and the first rate.

The receiving module 101 is further configured to receive an HO ODU frame to which a timeslot decrease indication is added and that is sent by the third NE, where the timeslot decrease indication is used to instruct a timeslot, occupied by the ODUflex bit stream, of the HO ODU frame, starting from a next HO ODU frame of the HO ODU frame to which the timeslot decrease indication is added, to decrease from Y timeslots to X timeslots, where X is greater than zero and less than Y, and X timeslots occupied by the ODUflex bit stream at the first rate are capable of bearing the ODUflex bit stream at the first rate.

The demapping module 102 is configured to, starting from the next HO ODU frame of the HO ODU frame to which the timeslot decrease indication is added, demap the ODUflex bit stream at the first rate from the X timeslots of the HO ODU frame according to the timeslot decrease indication.

Optionally, the apparatus may further include a sending module. The sending module is configured to, after receiving the HO ODU frame to which the timeslot decrease indication is added and that is sent by the third NE, if the apparatus is a sink NE, send response information that the rate decrease indication has been received to the third NE.

Optionally, the bit stream at the third rate is a bit stream formed by the ODUflex bit stream at the first rate and the idle data bit stream at the second rate according to a byte interleaving manner.

Optionally, a decrease ratio of the timeslot occupied by the ODUflex bit stream is the same as a decrease ratio of the rate of the ODUflex bit stream.

For functions of each module described above, refer to the description in the embodiment corresponding to FIG. 4, and details are not described herein again.

In the foregoing technical solutions, a bit stream at a high rate formed by an ODUflex bit stream at a low rate and an idle data bit stream is received first in an HO ODU frame according to a rate decrease indication in an ODUflex frame. After an HO ODU frame including a timeslot decrease indication is received, starting from a next HO ODU frame, the ODUflex bit stream at a low rate is received in a timeslot of the decreased HO ODU frame. Therefore, a rate matching between the ODUflex frame and the HO ODU frame to which the ODUflex frame is loaded is implemented, and a purpose for a hitless bandwidth decrease of an ODUflex bit stream channel is achieved. In a process of increasing a variable optical channel, a change rate and a step size of the number of m-bit client entities are not dependent on; and therefore, a period of decreasing variable optical channel bandwidth is shortened.

Figure 11:
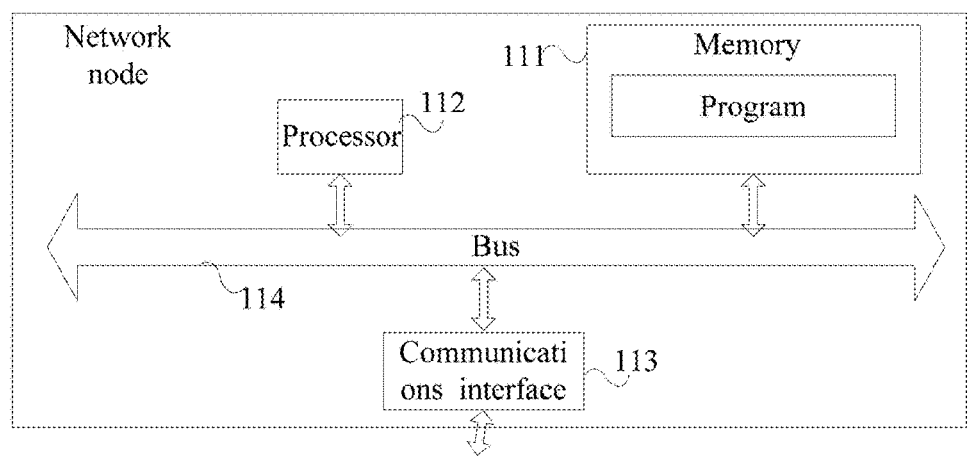
FIG. 11 is a schematic structural diagram of a first network node according to an embodiment of the present invention.

As shown in FIG. 11, an embodiment of the present invention further provides a first network node, including: a memory 111, a processor 112, a communications interface 113, and a bus 114. The memory, the processor, and the communications interface communicate with each other by using the bus.

The memory is configured to store a program; the processor is configured to execute the program executed in the memory; and the communications interface is configured to communicate with a second NE and a third NE, where the third NE is an upstream NE of the first NE in a link through which a service stream flows, and the second NE is a downstream NE of the first NE in the link.

The program is configured to:

add a timeslot increase indication to an HO ODU frame and send the HO ODU frame to which the timeslot increase indication is added to the second NE, where the timeslot increase indication is used to instruct a timeslot, occupied by an ODUflex bit stream, of the HO ODU frame, starting from a next HO ODU frame of the HO ODU frame, to increase from X timeslots to Y timeslots, X is greater than zero and less than Y, and the second NE is the downstream NE of the first NE in the link through which the service stream flows;

starting from the next HO ODU frame of the HO ODU frame to which the timeslot increase indication is added, map a bit stream at a third rate formed by an ODUflex bit stream at the first rate and an idle data bit stream at a second rate to the Y timeslots of the HO ODU frame and send the HO ODU frame to the second NE, where both the first rate and the second rate are less than the third rate, and the second rate is a difference value between the third rate and the first rate;

after each NE in the link receives the HO ODU frame to which the timeslot increase indication is added, map an ODUflex frame to which a rate increase indication is added to the HO ODU frame and send the HO ODU frame to the downstream NE, where the ODUflex frame to which the rate increase indication is added is an ODUflex frame bearing the ODUflex bit stream, the rate increase indication is used to instruct a rate of the ODUflex bit stream, starting from a next ODUflex frame of the ODUflex frame to which the rate increase indication is added, to increase from the first rate to the third rate, and the Y timeslots occupied by the ODUflex bit stream at the third rate are capable of bearing the ODUflex bit stream at the third rate; and starting from the next ODUflex frame of the ODUflex frame to which the rate increase indication is added, map the ODUflex bit stream at the third rate to the Y timeslots of the HO ODU frame and send the HO ODU frame to the second NE.

Optionally, the program is further configured to: if the first NE is an intermediate NE in the link, and if the first NE adds the timeslot increase indication to an HO ODU frame that is received from the third NE by the first NE, add the timeslot increase indication extracted from the received HO ODU frame to the HO ODU frame to be sent to the second NE.

Optionally, the program is further configured to: if the NE is a source NE, before the first NE maps the ODUflex to which the rate increase indication is added to the HO ODU frame and sends the HO ODU frame to the second NE, and after receiving response information, returned by a sink NE, that the HO ODU frame to which the timeslot increase indication is added has been received, add the rate increase indication to the ODUflex frame.

Optionally, the program is further configured to: starting from the next HO ODU frame of the HO ODU frame to which the timeslot increase indication is added, map the bit stream at the third rate that is formed by, according to a byte interleaving manner, the ODUflex bit stream at the first rate and the idle data bit stream at the second rate to the Y timeslots of the HO ODU frame.

Optionally, an increase ratio of the rate of the ODUflex bit stream is the same as an increase ratio of the timeslot of the ODUflex.

In the foregoing technical solutions, an NE sends, in a current HO ODU frame, a timeslot increase indication of an ODUflex bit stream to a downstream NE, and starting from a next HO ODU frame, sends, in an increased timeslot in the HO ODU frame, a bit stream at a high rate formed by an ODUflex bit stream at an original rate and an idle data bit stream to the downstream NE. Then, a rate increase indication is sent, in an ODUflex frame, to the downstream NE, and starting from a next ODUflex frame, an ODUflex bit stream at a high rate is sent, in the increased timeslot in the HO ODU frame, to the downstream NE. In a process of increasing a variable optical channel, a change rate and a step size of the number of m-bit client entities are not dependent on; and therefore, a period of increasing the variable optical channel bandwidth is shortened. In a phase of timeslot increasing, the NE first sends, in the HO ODU frame after a timeslot is increased, a bit stream at a high rate formed by an ODUflex bit stream and an idle data bit stream to the downstream NE, and after a timeslot, occupied by the ODUflex bit stream, of the HO ODU frame increases in each link segment between a source NE and a sink NE, sends an ODUflex bit stream at a high rate to the downstream NE, so that a rate matching between the ODUflex frame and the HO ODU frame to which the ODUflex frame is loaded is implemented, a purpose for a hitless channel bandwidth increase is achieved, and it is not necessary to reserve resources for the ODUflex frame in advance.

Figure 12:
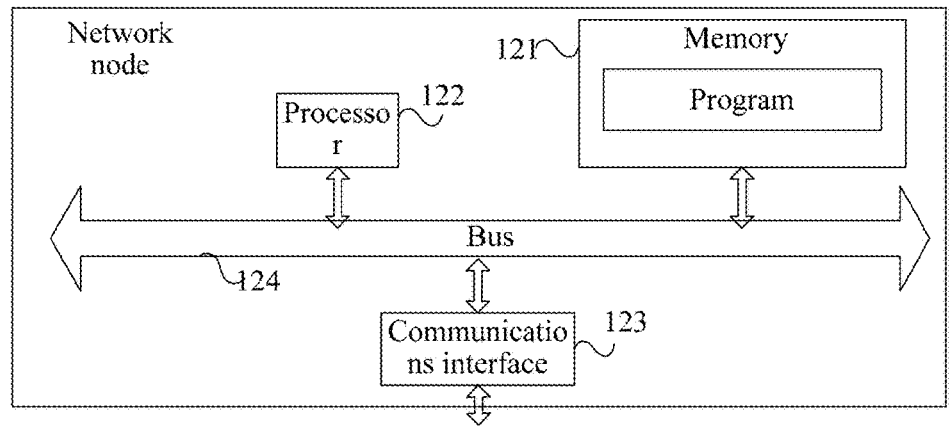
FIG. 12 is a schematic structural diagram of another first network node according to an embodiment of the present invention.

As shown in FIG. 12, an embodiment of the present invention further provides another first network node, including: a memory 121, a processor 122, a communications interface 123, and a bus 124.

The memory, the processor, and the communications interface communicate with each other by using the bus.

The memory is configured to store a program; the processor is configured to execute the program executed in the memory; and the communications interface is configured to communicate with a second NE and a third NE, where the third NE is an upstream NE of the first NE in a link through which a service stream flows, and the second NE is a downstream NE of the first NE in the link.

The program is configured to:

receive an ODUflex frame to which a rate decrease indication is added and that is sent by the third NE, where rate decrease indication is used to instruct a rate of an ODUflex bit stream, starting from a next ODUflex frame of the ODUflex frame to which the rate decrease indication is added, to decrease from a third rate to a first rate;

starting from the next ODUflex frame of the ODUflex frame to which the rate decrease indication is added, demap from Y timeslots of an HO ODU frame, according to the rate decrease indication, a bit stream at the third rate formed by an ODUflex bit stream at the first rate and an idle data bit stream at a second rate, and extract the ODUflex bit stream at the first rate from the bit stream at the third rate, where the second rate is a difference value between the third rate and the first rate;

receive an HO ODU frame to which a timeslot decrease indication is added and that is sent by the third NE, where the timeslot decrease indication is used to instruct the ODUflex bit stream, starting from a next HO ODU frame of the HO ODU frame to which the timeslot decrease indication is added, to decrease an occupied timeslot in the HO ODU frame from the Y timeslots to X timeslots, X is greater than zero and less than Y, and a rate corresponding to the X timeslots of the HO ODU frame is greater than or equal to the first rate; and starting from the next HO ODU frame of the HO ODU frame to which the timeslot decrease indication is added, demap the ODUflex bit stream at the first rate from the X timeslots of the HO ODU frame according to the timeslot decrease indication.

Optionally, the program is further configured to:

after the first NE receives an HO ODU frame to which a timeslot increase indication is added and that is sent by the second NE, if the first NE is a sink NE, send response information that the rate decrease indication has been received to the second NE.

Optionally, the bit stream at the third rate is a bit stream formed by the ODUflex bit stream at the first rate and the idle data bit stream at the second rate according to a byte interleaving manner.

Optionally, an increase ratio of the rate of the ODUflex bit stream is the same as an increase ratio of the timeslot of the ODUflex.

In the foregoing technical solutions, starting from a next HO ODU frame, an NE receives, in an increased timeslot according to a timeslot increase indication in a previous HO ODU frame, a bit stream at a high rate formed by an ODUflex bit stream at an original rate and an idle data bit stream at the original rate. After a timeslot, occupied by an ODUflex bit stream, of the HO ODU frame increases in each link segment between a source NE and a sink NE, starting from the next HO ODU, the NE receives an ODUflex bit stream at a high rate in the increased timeslot according to a rate increase indication in a previous ODUflex frame. Therefore, a rate matching between the ODUflex frame and the HO ODU frame to which the ODUflex frame is loaded is implemented, a purpose for a hitless channel bandwidth increase is achieved, and it is not necessary to reserve resources for the ODUflex frame in advance. In a process of increasing a variable optical channel, a change rate and a step size of the number of m-bit client entities are not dependent on; and therefore, a period of increasing the variable optical channel bandwidth is shortened.

Figure 13:
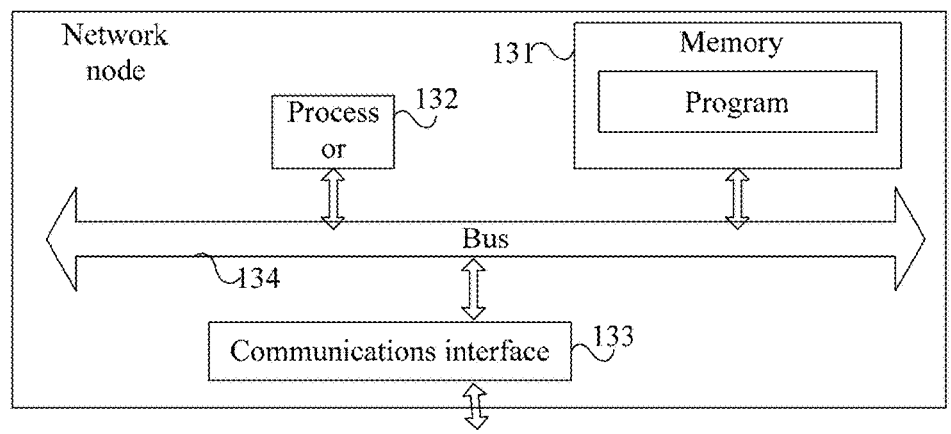
FIG. 13 is a schematic structural diagram of yet another first network node according to an embodiment of the present invention.

As shown in FIG. 13, an embodiment of the present invention further provides yet another first network node, including: a memory 131, a processor 132, a communications interface 133, and a bus 134.

The memory is configured to store a program; the processor is configured to execute the program executed in the memory; and the communications interface is configured to communicate with a second NE and a third NE, where the third NE is an upstream NE of the first NE in a link through which a service stream flows, and the second NE is a downstream NE of the first NE in the link.

The program is configured to:

send an ODUflex frame to which a rate decrease indication is added to the second NE, where the rate decrease indication is used to instruct a rate of an ODUflex bit stream, starting from a next ODUflex frame of the ODUflex frame to which the rate decrease indication is added, to decrease from a third rate to a first rate, where:

starting from the next ODUflex frame of the ODUflex frame to which the rate decrease indication is added, the first NE maps a bit stream at the third rate formed by an ODUflex bit stream at the first rate and an idle data bit stream at a second rate to Y timeslots of an HO ODU frame and sends the HO ODU frame to the second NE, where the second rate is less than the third rate, and the second rate is a difference value between the third rate and the first rate;

after each NE in the link receives the ODUflex frame to which the rate decrease indication is added, the first NE adds a timeslot decrease indication to the HO ODU frame and sends the HO ODU frame to which the timeslot decrease indication is added to the second NE, where the timeslot decrease indication is used to instruct a timeslot, occupied by the ODUflex bit stream, of the HO ODU frame, starting from a next HO ODU frame of the HO ODU frame to which the timeslot decrease instruction is added, to decrease from the Y timeslots to X timeslots, X is greater than zero and less than Y, and a rate corresponding to the X timeslots of the HO ODU frame is greater than or equal to the first rate; and starting from the next HO ODU frame of the HO ODU frame to which the timeslot decrease indication is added, the first NE maps the ODUflex bit stream at the first rate to the X timeslots in the HO ODU frame and sends the HO ODU frame to the second NE.

Optionally, the program is further configured to:

before sending the ODUflex frame to which the rate decrease indication is added to the second NE, if the first NE is a source NE, add the rate decrease indication to the ODUflex frame sent to the second NE.

Optionally, the program is further configured to:

if the first NE is the source NE, after receiving response information, returned by a sink NE, that the ODUflex frame to which the rate decrease indication is added has been received, add the timeslot decrease indication to the HO ODU frame; and if the first NE is an intermediate NE, and an HO ODU frame that is received by the first NE and sent by the third NE includes the timeslot decrease indication, add the timeslot decrease indication extracted from the HO ODU frame sent from the third NE to the HO ODU frame to be sent to the second NE, where the third NE is an upstream NE of the first NE in the link through which the service stream flows.

In the foregoing technical solutions, an NE sends, in a current ODUflex frame, a rate decrease indication to a downstream NE, and starting from a next ODUflex frame sent to the downstream NE, decreases a rate of an ODUflex bit stream; and then, adds a timeslot decrease indication to a current HO ODU frame, and starting from a next HO ODU frame, decreases a timeslot occupied by the ODUflex frame in the HO ODU frame. In a process of increasing a variable optical channel, a change rate and a step size of the number of m-bit client entities are not dependent on; and therefore, a period of decreasing variable optical channel bandwidth is shortened. In a phase of rate decreasing, in an original timeslot occupied by a bit stream at an original rate in the HO ODU frame, a bit stream at a high rate formed by an ODUflex bit stream at a low rate and an idle data bit stream to the downstream NE. After a rate of an ODUflex bit stream in each link segment between a source NE and a sink NE decreases, the ODUflex bit stream at a low rate is sent, in the HO ODU frame after a timeslot is decreased, to the downstream NE, so that a rate matching between the ODUflex frame and the HO ODU frame to which the ODUflex frame is loaded is implemented, and a purpose for a hitless channel bandwidth decrease is achieved.

Figure 14:
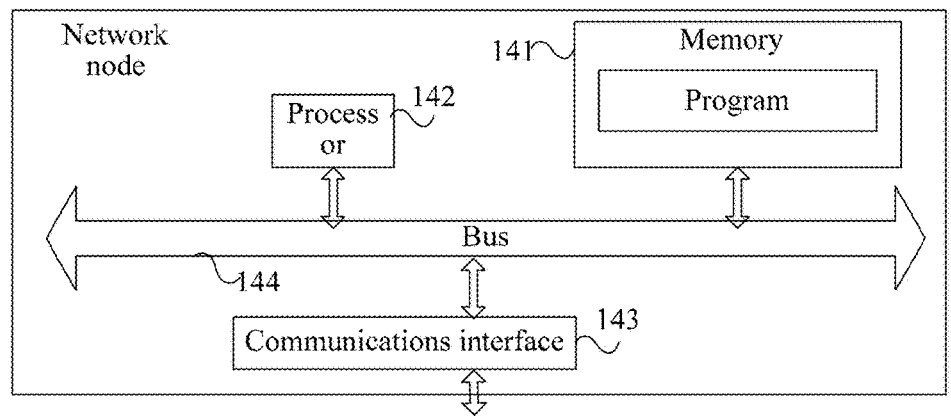
FIG. 14 is a schematic structural diagram of still another first network node according to an embodiment of the present invention.

As shown in FIG. 14, an embodiment of the present invention further provides still another first network node, including: a memory 141, a processor 142, a communications interface 143, and a bus 144.

The memory is configured to store a program; the processor is configured to execute the program executed in the memory; and the communications interface is configured to communicate with a second NE and a third NE, where the third NE is an upstream NE of the first NE in a link through which a service stream flows, and the second NE is a downstream NE of the first NE in the link.

The program is configured to:

receive an ODUflex frame to which a rate decrease indication is added and that is sent by a third NE, where the rate decrease indication is used to instruct a rate of an ODUflex bit stream, starting from a next ODUflex frame of the ODUflex frame to which the rate decrease indication is added, to decrease from a third rate to a first rate;

starting from the next ODUflex frame of the ODUflex frame to which the rate decrease indication is added, demap from Y timeslots of an HO ODU frame, according to the rate decrease indication, a bit stream at the third rate formed by an ODUflex bit stream at the first rate and an idle data bit stream at a second rate, and extract the ODUflex bit stream at the first rate from the bit stream at the third rate, where the second rate is a difference value between the third rate and the first rate;

receive an HO ODU frame to which the timeslot decrease indication is added and that is sent by the third NE, where the timeslot decrease indication is used to instruct a timeslot, occupied by the ODUflex bit stream, of the HO ODU frame, starting from a next HO ODU frame of the HO ODU frame to which the timeslot decrease indication is added, to decrease from Y timeslots to X timeslots, where X is greater than zero and less than Y, and X timeslots occupied by the ODUflex bit stream at the first rate are capable of bearing the ODUflex bit stream at the first rate; and starting from the next HO ODU frame of the HO ODU frame to which the timeslot decrease indication is added, demap the ODUflex bit stream at the first rate from the X timeslots of the HO ODU frame according to the timeslot decrease indication.

Optionally, the program is further configured to:

after the first network node receives the HO ODU frame to which the timeslot decrease indication is added and that is sent by the second network node, if the first network node is a sink network node, send response information that the rate decrease indication has been received to the second network node.

Optionally, the bit stream at the third rate is a bit stream formed by the ODUflex bit stream at the first rate and the idle data bit stream at the second rate according to a byte interleaving manner.

Optionally, a decrease ratio of the timeslot occupied by the ODUflex bit stream is the same as a decrease ratio of the rate of the ODUflex bit stream.

In the foregoing technical solutions, an NE first receives, in an HO ODU frame according to a rate decrease indication in an ODUflex frame, a bit stream at a high rate formed by an ODUflex bit stream at a low rate and an idle data bit stream. After an HO ODU frame including a timeslot decrease indication is received, starting from a next HO ODU frame, the ODUflex bit stream at a low rate is received in a timeslot of the decreased HO ODU frame. Therefore, a rate matching between the ODUflex frame and the HO ODU frame to which the ODUflex frame is loaded is implemented, and a purpose for a hitless bandwidth decrease of an ODUflex bit stream channel is achieved. In a process of increasing a variable optical channel, a change rate and a step size of the number of m-bit client entities are not dependent on; and therefore, a period of decreasing the variable optical channel bandwidth is shortened.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for increasing variable optical channel bandwidth, the method comprising:

adding, by a first network node, a timeslot increase indication to a higher order optical channel data unit (HO ODU) frame and sending the HO ODU frame to which the timeslot increase indication is added to a second network node, wherein the timeslot increase indication is used to instruct a timeslot, occupied by a flexible optical transport data unit (ODUflex) bit stream, of the HO ODU frame, starting from a next HO ODU frame of the HO ODU frame, to increase from X timeslots to Y timeslots, X is greater than zero and less than Y, and the second network node is a downstream network node of the first network node in a link through which a service stream flows;

starting from the next HO ODU frame of the HO ODU frame to which the timeslot increase indication is added, mapping, by the first network node, a bit stream at a third rate formed by an ODUflex bit stream at a first rate and an idle data bit stream at a second rate to the Y timeslots of the HO ODU frame and sending the HO ODU frame to the second network node, wherein a rate corresponding to the Y timeslots of the HO ODU frame is greater than or equal to the third rate, both the first rate and the second rate are less than the third rate, and the second rate is a difference value between the third rate and the first rate;

after each network node in the link receives the HO ODU frame to which the timeslot increase indication is added, mapping, by the first network node, an ODUflex frame to which a rate increase indication is added to the HO ODU frame and sending the HO ODU frame to the second network node, wherein the ODUflex frame to which the rate increase indication is added is an ODUflex frame bearing the ODUflex bit stream, and the rate increase indication is used to instruct a rate of the ODUflex bit stream, starting from a next ODUflex frame of the ODUflex frame to which the rate increase indication is added, to increase from the first rate to the third rate; and starting from the next ODUflex frame of the ODUflex frame to which the rate increase indication is added, mapping, by the first network node, the ODUflex bit stream at the third rate to the Y timeslots of the HO ODU frame and sending the HO ODU frame to the second network node.

2. The method according to claim 1, wherein an increase ratio of the rate of the ODUflex bit stream is the same as an increase ratio of the timeslot occupied by the ODUflex bit stream.

3. The method according to claim 1, wherein adding, by a first network node, a timeslot increase indication to an HO ODU frame comprises:
if the first network node is an intermediate network node in the link, and if the first network node adds the timeslot increase indication to an HO ODU frame that is received by a third network node, adding, by the first network node, the timeslot increase indication extracted from the received HO ODU frame to the HO ODU frame to be sent to the second network node, wherein the third network node is an upstream network node of the first network node in the link.

4. The method according to claim 1, wherein if the first network node is a source network node, before mapping, by the first network node, an ODUflex to which a rate increase indication is added to the HO ODU frame and sending the HO ODU frame to the second network node, the method further comprises:
after receiving response information, returned by a sink network node, that the HO ODU frame to which the timeslot increase indication is added has been received, adding, by the first network node, the rate increase indication to the ODUflex frame.

5. The method according to claim 1, wherein mapping a bit stream at a third rate formed by an ODUflex bit stream at the first rate and an idle data bit stream at a second rate to the Y timeslots of the HO ODU frame comprises:
mapping the bit stream at the third rate that is formed by, according to a byte interleaving manner, the ODUflex bit stream at the first rate and the idle data bit stream at the second rate to the Y timeslots of the HO ODU frame.

6. A method for increasing variable optical channel bandwidth, the method comprising:
receiving, by a first network node, a higher order optical channel data unit (HO ODU) frame to which a timeslot increase indication is added and that is sent by a third network node, wherein the timeslot increase indication is used to instruct a timeslot, occupied by a flexible optical transport data unit (ODUflex) bit stream, of the HO ODU frame, starting from a next HO ODU frame of the HO ODU frame, to increase from X timeslots to Y timeslots, X is less than Y, and the third network node is an upstream network node of the first network node in a link through which a service stream flows;
starting from the next HO ODU frame of the HO ODU frame to which the timeslot increase indication is added, demapping, by the first network node, from the Y timeslots of the HO ODU frame according to the timeslot increase indication, a bit stream at a third rate formed by an ODUflex bit stream at a first rate and an idle data bit stream at a second rate, and extracting the ODUflex bit stream at the first rate from the bit stream at the third rate, wherein a rate corresponding to the Y timeslots of the HO ODU frame is greater than or equal to the third rate, both the first rate and the second rate are less than the third rate, and the second rate is a difference value between the third rate and the first rate;
receiving, by the first network node, an ODUflex frame to which a rate increase indication is added and that is sent by the third network node, wherein the rate increase indication is used to instruct that a rate of the ODUflex bit stream, starting from a next ODUflex frame of the ODUflex frame to which the rate increase indication is added, to increase from the first rate to the third rate, and the ODUflex frame to which the rate increase indication is added is an ODUflex frame bearing the ODUflex bit stream; and
starting from the next ODUflex frame of the ODUflex frame to which the rate increase indication is added, demapping, by the first network node, an ODUflex bit stream at the third rate from the Y timeslots of the received HO ODU frame according to the rate increase indication.

7. The method according to claim 6, wherein an increase ratio of the rate of the ODUflex bit stream is the same as an increase ratio of the timeslot occupied by the ODUflex bit stream.

8. The method according to claim 6, wherein after receiving, by a first network node, an HO ODU frame to which a timeslot increase indication is added and that is sent by a third network node, the method further comprises:
if the first network node is a sink network node, sending, by the first network node, response information that the timeslot increase indication has been received to the third network node.

9. The method according to claim 6, wherein the bit stream at the third rate is a bit stream formed by the ODUflex bit stream at the first rate and the idle data bit stream at the second rate according to a byte interleaving manner.

10. A first network node, comprising:
a memory, a processor, a communications interface, and a bus, wherein the memory, the processor, and the communications interface communicate with each other by using the bus;
wherein the memory is configured to store a program, the processor is configured to execute the program stored in the memory, and the communications interface is configured to communicate with a second network node and a third network node, wherein the third network node is an upstream network node of the first network node in a link through which a service stream flows, and the second network node is a downstream network node of the first network node in the link; and
wherein the processor, when executing the program, is configured to:
add a timeslot increase indication to a higher order optical channel data unit (HO ODU) frame and send the HO ODU frame to which the timeslot increase indication is added to the second network node, wherein the timeslot increase indication is used to instruct a timeslot, occupied by a flexible optical transport data unit (ODUflex) bit stream, of the HO ODU frame, starting from a next HO ODU frame of the HO ODU frame, to increase from X timeslots to Y timeslots, X is greater than zero and less than Y, and the second network node is the downstream network node of the first network node in the link through which the service stream flows,
starting from the next HO ODU frame of the HO ODU frame to which the timeslot increase indication is added, map a bit stream at a third rate formed by an ODUflex bit stream at a first rate and an idle data bit stream at a second rate to the Y timeslots of the HO ODU frame and send the HO ODU frame to the second network node, wherein both the first rate and the second rate are less than the third rate, and the second rate is a difference value between the third rate and the first rate, after each network node in the link receives the HO ODU frame to which the timeslot increase indication is added, map an ODUflex frame to which a rate increase indication is added to the HO ODU frame and send the HO ODU frame to the downstream network node, wherein the ODUflex frame to which the rate increase indication is added is an ODUflex frame bearing the ODUflex bit stream, the rate increase indication is used to instruct a rate of the ODUflex bit stream, starting from a next ODUflex frame of the ODUflex frame to which the rate increase indication is added, to increase from the first rate to the third rate, and the Y timeslots occupied by the ODUflex bit stream at the third rate are capable of bearing the ODUflex bit stream at the third rate, and starting from the next ODUflex frame of the ODUflex frame to which the rate increase indication is added, map the ODUflex bit stream at the third rate to the Y timeslots of the HO ODU frame and send the HO ODU frame to the second network node.

11. The first network node according to claim 10, wherein the processor, when executing the program, is further configured to:

if the first network node is an intermediate network node in the link, and if the first network node adds the timeslot increase indication to an HO ODU frame that is received by the third network node, add the timeslot increase indication extracted from the received HO ODU frame to the HO ODU frame to be sent to the second network node.

12. The first network node according to claim 10, wherein the processor, when executing the program, is further configured to:

if the first network node is a source network node, before the first network node maps the ODUflex bit stream to which the rate increase indication is added to the HO ODU frame and sends the HO ODU frame to the second network node, and after receiving response information, returned by a sink network node, that the HO ODU frame to which the timeslot increase indication is added has been received, add the rate increase indication to the ODUflex frame.

13. The first network node according to claim 10, wherein the processor, when executing the program, is further configured to:

starting from the next HO ODU frame of the HO ODU frame to which the timeslot increase indication is added, map the bit stream at the third rate that is formed by, according to a byte interleaving manner, the ODUflex bit stream at the first rate and the idle data bit stream at the second rate to the Y timeslots of the HO ODU frame.

14. The first network node according to claim 10, wherein an increase ratio of the rate of the ODUflex bit stream is the same as an increase ratio of the timeslot occupied by the ODUflex bit stream.

15. A first network node, comprising:

a memory, a processor, a communications interface, and a bus, wherein the memory, the processor, and the communications interface communicate with each other by using the bus;

wherein the memory is configured to store a program, the processor is configured to execute the program executed in the memory, and the communications interface is configured to communicate with a second network node and a third network node, wherein the third network node is an upstream network node of the first network node in a link through which a service stream flows, and the second network node is a downstream network node of the first network node in the link; and wherein the processor, when executing the program, is configured to:

receive a higher order optical channel data unit (HO ODU) frame to which a timeslot increase indication is added and that is sent by the third network node, wherein the timeslot increase indication is used to instruct a timeslot, occupied by a flexible optical transport data unit (ODUflex) bit stream, of the HO ODU frame, starting from a next HO ODU frame of the HO ODU frame, to increase from X timeslots to Y timeslots, and X is less than Y, starting from the next HO ODU frame of the HO ODU frame to which the timeslot increase indication is added, demap from the Y timeslots of the HO ODU frame, according to the timeslot increase indication, a bit stream at a third rate formed by an ODUflex bit stream at a first rate and an idle data bit stream at a second rate, and extract the ODUflex bit stream at the first rate from the bit stream at the third rate, wherein a rate corresponding to the Y timeslots of the HO ODU frame is greater than or equal to the third rate, both the first rate and the second rate are less than the third rate, and the second rate is a difference value between the third rate and the first rate, receive an ODUflex frame to which a rate increase indication is added and that is sent by the third network node, wherein the rate increase indication is used to instruct a rate of the ODUflex bit stream, starting from a next ODUflex frame of the ODUflex frame to which the rate increase indication is added, to increase from the first rate to the third rate, and the ODUflex frame to which the rate increase indication is added is an ODUflex frame bearing the ODUflex bit stream, and starting from the next ODUflex frame of the ODUflex frame to which the rate increase indication is added, demap the ODUflex bit stream at the third rate from the Y timeslots of the received HO ODU frame according to the rate increase indication.

16. The first network node according to claim 15, wherein the processor, when executing the program, is further configured to:

after the first network node receives the HO ODU frame to which the timeslot increase indication is added and that is sent by the second network node, if the first network node is a sink network node, send response information that the timeslot increase indication has been received to the third network node.

17. The first network node according to claim 15, wherein the bit stream at the third rate is a bit stream formed by the ODUflex bit stream at the first rate and the idle data bit stream at the second rate according to a byte interleaving manner.

18. The first network node according to claim 15, wherein an increase ratio of the rate of the ODUflex bit stream is the same as an increase ratio of the timeslot occupied by the ODUflex bit stream.

* * * * *